(12) United States Patent
Jiang et al.

(10) Patent No.: US 8,618,219 B2
(45) Date of Patent: *Dec. 31, 2013

(54) PROPYLENE COPOLYMERS FOR ADHESIVE APPLICATIONS

(75) Inventors: Peijun Jiang, League City, TX (US); Patrick Brant, Seabrook, TX (US); David Aaron Henning, Ponca City, OK (US); David R. Johnsrud, Humble, TX (US); Charles L. Sims, Houston, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 812 days.

This patent is subject to a terminal disclaimer.

(21) Appl. No.: 11/541,185

(22) Filed: Sep. 29, 2006

(65) Prior Publication Data

US 2010/0029851 A9   Feb. 4, 2010

Related U.S. Application Data

(63) Continuation-in-part of application No. 10/687,508, filed on Oct. 15, 2003, now Pat. No. 7,294,681.

(60) Provisional application No. 60/418,482, filed on Oct. 15, 2002, provisional application No. 60/460,714, filed on Apr. 4, 2003.

(51) Int. Cl.
*C08L 23/00* (2006.01)
*C08L 23/04* (2006.01)
*C08F 110/14* (2006.01)
*C08F 10/14* (2006.01)

(52) U.S. Cl.
USPC ..... 525/240; 525/191; 526/348.2; 526/348.5; 526/158; 526/162

(58) Field of Classification Search
USPC ............... 525/191, 240; 526/348.5
See application file for complete search history.

(56) References Cited

U.S. PATENT DOCUMENTS

| | | | |
|---|---|---|---|
| 3,821,143 A * | 6/1974 | Cluff et al. | 524/476 |
| 3,868,433 A | 2/1975 | Bartz et al. | |
| 3,882,065 A | 5/1975 | Snow, Jr. et al. | |
| 3,954,697 A | 5/1976 | McConnell et al. | 526/530 |
| 3,987,122 A | 10/1976 | Bartz et al. | |
| 4,120,916 A * | 10/1978 | Meyer et al. | 525/240 |
| 4,210,570 A | 7/1980 | Trotter et al. | |
| 4,382,128 A | 5/1983 | Li | |
| 5,075,386 A | 12/1991 | Vanderbilt | |
| 5,231,126 A | 7/1993 | Shi et al. | |
| 5,317,070 A | 5/1994 | Brant et al. | |
| 5,326,639 A * | 7/1994 | Leonard et al. | 428/402 |
| 5,455,111 A | 10/1995 | Velasquez Urey | |
| 5,468,807 A * | 11/1995 | Tsurutani et al. | 525/240 |
| 5,516,848 A * | 5/1996 | Canich et al. | 525/240 |
| 5,530,054 A | 6/1996 | Tse et al. | |
| 5,539,056 A | 7/1996 | Yang et al. | |
| 5,548,014 A | 8/1996 | Tse et al. | |
| 5,874,512 A | 2/1999 | Farley et al. | |
| 5,986,009 A * | 11/1999 | Thoen et al. | 525/232 |
| 5,998,039 A | 12/1999 | Tanizaki et al. | |
| 6,143,825 A | 11/2000 | Beren et al. | |
| 6,143,846 A | 11/2000 | Herrmann et al. | |
| 6,184,327 B1 | 2/2001 | Weng et al. | |
| 6,214,447 B1 | 4/2001 | Nakagawa et al. | |
| 6,221,448 B1 | 4/2001 | Baetzold et al. | 428/35.2 |
| 6,248,832 B1 * | 6/2001 | Peacock | 525/191 |
| 6,323,284 B1 | 11/2001 | Peacock | |
| 6,342,574 B1 | 1/2002 | Weng et al. | |
| 6,391,974 B1 | 5/2002 | Ogawa et al. | |
| 6,407,171 B1 | 6/2002 | Agarwal et al. | |
| 6,486,246 B1 * | 11/2002 | Vion | 524/271 |
| 6,500,563 B1 | 12/2002 | Datta et al. | |
| 6,573,350 B1 | 6/2003 | Markel et al. | |
| 6,573,352 B1 | 6/2003 | Tatsumi et al. | |
| 6,627,723 B2 | 9/2003 | Karandinos et al. | 526/348 |
| 6,639,020 B1 | 10/2003 | Brant | |
| 6,657,009 B2 * | 12/2003 | Zhou | 525/191 |
| 6,660,809 B1 | 12/2003 | Weng et al. | |
| 6,747,114 B2 | 6/2004 | Karandinos et al. | 526/348.2 |
| 6,774,069 B2 | 8/2004 | Zhou et al. | |
| 6,800,700 B2 | 10/2004 | Sun | |
| 6,884,846 B2 | 4/2005 | Pradel | |
| 6,884,850 B2 | 4/2005 | Schauder et al. | |
| 6,960,635 B2 | 11/2005 | Stevens et al. | |
| 7,294,681 B2 | 11/2007 | Jiang et al. | |
| 7,476,710 B2 * | 1/2009 | Mehta et al. | 525/191 |
| 7,524,910 B2 | 4/2009 | Jiang et al. | |
| 7,550,528 B2 | 6/2009 | Abhari et al. | |
| 7,770,707 B2 | 8/2010 | Brees et al. | |
| 2001/0007896 A1 | 7/2001 | Agarwal et al. | |
| 2001/0044506 A1 | 11/2001 | Mehta et al. | |
| 2001/0049331 A1 | 12/2001 | Chang | |
| 2002/0007033 A1 | 1/2002 | Karandinos et al. | |
| 2002/0019507 A1 * | 2/2002 | Karandinos et al. | 526/348.2 |
| 2002/0039623 A1 | 4/2002 | Faissat et al. | |
| 2002/0123538 A1 | 9/2002 | Zhou et al. | |
| 2002/0124956 A1 | 9/2002 | Zhou | |
| 2003/0065097 A1 * | 4/2003 | DeGroot et al. | 525/240 |
| 2003/0078350 A1 | 4/2003 | Weng et al. | |

(Continued)

FOREIGN PATENT DOCUMENTS

| EP | 0 442 245 | 8/1991 | |
|---|---|---|---|
| EP | 0527589 | 2/1993 | C08L 23/10 |

(Continued)

*Primary Examiner* — Irina Krylova

(57) ABSTRACT

Disclosed herein is an in-reactor produced multi-component copolymer comprises a semi-crystalline component having a crystallinity of 20% or more, and an amorphous component having a crystallinity of 5% or less. The copolymer comprises at least 80 wt % of units derived from propylene and from about 1 to about 20 wt % of units derived from at least one $C_6$ to $C_{12}$ alpha-olefin. The copolymer has a viscosity at 190° C. of at least 530 mPa sec and a heat of fusion between about 10 and about 70 J/g. An adhesive containing the copolymer exhibits a good balance of adhesive properties and mechanical strength.

5 Claims, No Drawings

(56) References Cited

U.S. PATENT DOCUMENTS

| | | |
|---|---|---|
| 2003/0092844 A1 | 5/2003 | Pradel |
| 2004/0038058 A1* | 2/2004 | Zhou .................. 428/500 |
| 2004/0039117 A1 | 2/2004 | Kijima |
| 2004/0048984 A1 | 3/2004 | Weng et al. |
| 2004/0054086 A1 | 3/2004 | Schauder et al. |
| 2004/0127614 A1* | 7/2004 | Jiang et al. ............ 524/270 |
| 2004/0138392 A1 | 7/2004 | Jiang et al. ............ 526/114 |
| 2004/0220336 A1* | 11/2004 | Abhari et al. .......... 525/70 |
| 2004/0220359 A1 | 11/2004 | Abhari et al. |
| 2004/0249046 A1 | 12/2004 | Abhari et al. |
| 2007/0021566 A1 | 1/2007 | Tse et al. |
| 2008/0081868 A1 | 4/2008 | Jiang et al. |
| 2008/0081878 A1 | 4/2008 | Jiang et al. |

FOREIGN PATENT DOCUMENTS

| | | | |
|---|---|---|---|
| GB | 1 325 484 | 8/1973 | |
| JP | 62-119212 | 5/1987 | |
| WO | 91/07472 | 5/1991 | |
| WO | 95/10575 | 4/1995 | |
| WO | WO 96/23838 | 8/1996 | ............ C08L 23/10 |
| WO | 97/15636 | 5/1997 | |
| WO | WO 98/03603 | 1/1998 | ............ C09J 123/16 |
| WO | 98/34970 | 8/1998 | |
| WO | WO 99/24516 | 5/1999 | ........... C09D 123/16 |
| WO | 00/01745 | 1/2000 | |
| WO | 00/37514 | 6/2000 | |
| WO | 01/46277 | 6/2001 | |
| WO | 02/051931 | 7/2002 | |
| WO | 03/033612 | 4/2003 | |
| WO | WO 2004/046214 | 6/2004 | ............ C08F 210/06 |
| WO | 2005/100501 | 10/2005 | |
| WO | 2005/105941 | 11/2005 | |
| WO | 2005/113622 | 12/2005 | |
| WO | WO 2005/113622 | 12/2005 | |
| WO | 2007/002177 | 1/2007 | |

* cited by examiner

PROPYLENE COPOLYMERS FOR ADHESIVE APPLICATIONS

This application is a Continuation-in-Part of U.S. Ser. No. 10/687,508, filed Oct. 15, 2003, now U.S. Pat. No. 7,294,681, which claims priority to provisional U.S. Ser. No. 60/418,482, filed Oct. 15, 2002, and also claims priority to provisional U.S. Ser. No. 60/460,714, filed Apr. 4, 2003.

BACKGROUND

Certain alpha-olefin copolymers, generally in combination with tackifiers and flow promoters, have been used to produce adhesive compositions that yield a significant bond strength after application, show good paper adhesion (e.g. fiber tear on Kraft paper), minimum peel strength of 500 g/cm, low color and low odor.

Many of the alpha-olefin copolymers currently used in adhesive compositions are derived predominantly from ethylene (see, for example, International Patent Publication Nos. WO98/03603 and WO99/24516). For example, U.S. Pat. No. 6,221,448 discloses a cold seal composition comprising from about 10 wt % to 100 wt % of at least one homogeneous linear or substantially linear ethylene/alpha-olefin copolymer, wherein the alpha-olefin has 3 to 20 carbon atoms, such as octene-1, and the copolymer is produced using a single site metallocene catalyst. The cold seal composition is characterized as having a storage modulus (G') at 25° C. ranging from about $1 \times 10^6$ dynes/cm$^2$ to about $1 \times 10^9$ dynes/cm$^2$.

Copolymers derived predominantly from propylene have also been proposed for use in adhesive compositions. For example, U.S. Pat. No. 3,954,697 discloses a single component, hot-melt, pressure-sensitive adhesive based on propylene/higher 1-olefin copolymers containing 40-60 mole % of the higher 1-olefin. Suitable comonomers include 1-hexene, 1-heptene, 1-octene, 1-nonene and 1-decene. The copolymer has a melt viscosity range at 190° C. of 10,000 cp. to 75,000 cp, a density of 0.85 to 0.86, a glass transition temperature of −30 to −45° C., and has no melting point measurable by Differential Scanning Calorimetry. Thus the copolymer is amorphous with no residual crystallinity or crystallinity of a very low order. The copolymer is produced using a Ziegler-Natta catalyst.

JP62-119212-A2 discloses a random copolymer with from 40-90 mole % of propylene, from 10-60 mole % of an alpha-olefin such as butene, hexene, and 4-methylpentene produced using an ethylene-bis(tetrahydro-indenyl) zirconium dichloride as a catalyst. However, the Examples in JP62-119212-A2 give products having widely varying characteristics. Example 6 polymerizes propylene and hexene to give 60 percent of units derived from propylene and 40 mol % of units derived from hexene to give a copolymer with 26% crystallinity and a melting point of 123° C. Example 3 uses propylene at 45 mol % to produce a copolymer with a melting point of 50° C. and a crystallinity 7%. The copolymers are said to have anti-blocking characteristics and would be of no use in adhesive applications.

U.S. Pat. No. 6,627,723 discloses a poly-alpha olefin copolymer comprising (a) from 60 to 94 mol % of units derived from one alpha mono-olefin having from 3 to 6 carbon atoms, preferably propylene; (b) from 6 to 40 mol % of units derived from one or more other mono-olefins having from 4 to 10 carbon atoms and at least one carbon atom more than (a), preferably butene-1, hexene-1 or octene-1; and (c) optionally from 0 to 10 mol % of units derived from another copolymerizable unsaturated hydrocarbon, different from (a) and (b), preferably ethylene; wherein the diad distribution of component A in the inter-polymer as determined by $^{13}$C NMR divided by the calculated Bernoullian diad distribution is less than 1.07; and wherein the storage modulus G' of the copolymer determined on cooling, measured at 1 Hz, intersects $3 \times 10^5$ Pa at an intersection temperature of less than 85° C. The copolymer is produced by copolymerizing the monomers in the presence of a single site metallocene catalyst, preferably a bridged chiral bis-indenyl metallocene catalyst. The copolymer is largely amorphous and is said to be useful as a hot melt adhesive, both with and without the addition of tackifying resins.

U.S. Pat. No. 6,747,114 discloses an adhesive composition comprising a semi-crystalline copolymer of propylene and at least one comonomer selected from ethylene and $C_4$ to $C_{20}$ α-olefins having a propylene content of greater than 65 mole percent; wherein the copolymer has a weight average molecular weight (Mw) from about 15,000 to about 200,000; a melt index (MI) from about 7 dg/min to about 3000 dg/min as measured by ASTM D 1238(B); and a weight average molecular weight/number average molecular weight ratio (Mw/Mn) of approximately 2. In Example 4, propylene is copolymerized with between 11 and 19 wt % 1-hexene at a temperature of 76° C. to 90° C. over a catalyst comprising dimethylsilandiylbis(2-methyl-4-phenyl-1-indenyl)zirconium dimethyl activated with dimethylanilinium-tetrakis (pentafluorophenyl)borate to produce semi-crystalline copolymers having a melting temperature, $T_m$, between 93° C. and 107° C., a heat of fusion, ΔH, between 58.5 and 96.6 J/g and a melt viscosity at 190° C. of between 2230 and 66,000 cps. Pressure sensitive hot melt adhesives are formed by blending 30 wt % of each copolymer with 50 wt % of Escorez® 5380 tackifier and 20 wt % of Kaydol Oil and the resulting adhesives exhibit a tensile strength in excess of 127 psi, an elongation in excess of 368% and a Shear Adhesion Failure Temperature (SAFT) to Kraft paper of 74° C. to 83° C. In addition, for the copolymer formed from 19 wt % 1-hexene, a hot melt adhesive is formed by blending 80 wt % of the copolymer with 15 wt % of Escorez® 5380 tackifier and 5 wt % of Kaydol Oil. The resulting adhesive exhibits a tensile strength of 1452 psi, an elongation of 768% and a Shear Adhesion Failure Temperature (SAFT) to Kraft paper of 102.5° C. All of the adhesives formed had at least 20% of the other ingredients due to the high molecular weight of the starting copolymers, and had a long set time.

Despite these advances, it has proved difficult to develop a single adhesive composition that exhibits a good combination of properties, such as adhesion at low and high temperatures, set time, thermal stability and mechanical strength, while maintaining low application viscosity. Thus, individual copolymers rarely possess the necessary combination of properties required for adhesive applications. In an attempt to address this problem, two or more polyolefins having different characteristics have often been blended together in the hope of combining the positive attributes of the individual components. However, typically the result is a blend that displays an average of the individual properties of the individual resins.

For example EP 527589 discloses blends of flexible, low molecular weight amorphous polypropylene with higher molecular weight isotactic polypropylene to obtain compositions with balanced mechanical strength and flexibility. These compositions show better flexibility than isotactic polypropylene alone, but are still lacking in other physical attributes. Physical blends also have the problems of inadequate miscibility. Unless the components are selected for their compatibility, they can phase separate or smaller components can migrate to the surface. Reactor blends, also called intimate blends (a composition comprising two or more polymers made in the same reactor or in a series of reactors), have therefore been proposed to avoid the miscibility problems associated with physical blends.

For example, US Patent Application Publication No. 2004/0138392, published Jun. 15, 2004, discloses a continuous process for producing an adhesive comprising 1) selecting a first catalyst component capable of producing a polymer having an Mw of 100,000 or less and a crystallinity of 5% or less under selected polymerization conditions; 2) selecting a second catalyst component capable of producing polymer having an Mw of 100,000 or less and a crystallinity of 20% or more at the selected polymerization conditions; 3) contacting, in a solvent and in a reaction zone under the selected polymerization conditions, the catalyst components in the presence of one or more activators with one or more C3 to C40 olefins, and, optionally one or more diolefins; 4) at a temperature of greater than 100° C.; 5) at a residence time of 120 minutes or less; 6) wherein the ratio of the first catalyst to the second catalyst is from 1:1 to 50:1; 7) wherein the activity of the catalyst components is at least 50 kilograms of polymer per gram of the catalyst compounds; and wherein at least 80% of the olefins are converted to polymer; 8) withdrawing polymer solution from the reaction zone; 9) removing at least 10% solvent from the polymer solution; 10) quenching the reaction; 11) devolatilizing the polymer solution to form molten polymer; 12) combining the molten polymer and one or more additives in a static mixer; 13) removing the polymer combination from the static mixer; and 14) pelletizing or drumming the polymer combination.

In particular, Example 71 of US Patent Application Publication No. 2004/0138392 discloses the production of a copolymer of propylene, hexene and 1,9-decadiene by feeding propylene (14 g/minute or 81 wt %), hexene (3.29 g/minute or 19 wt %) and 1,9-decadiene (0.206 ml/min) to a liquid filled, single-stage continuous reactor using a mixed metallocene solution catalyst system comprising dimethylsilylbis(2-methyl-4-phenylindenyl)zirconium dimethyl and dimethylsilyl-(tetramethylcyclopentadienyl)(cyclododecylamido)titanium dimethyl at a temperature of 115° C. The product, comprising both amorphous and semi-crystalline propylene copolymers, had a Tm of 89.8° C., a Tc of 42.6° C., a glass transition temperature, Tg, of −15.2° C., a heat of fusion of 27.0 J/g and a viscosity of 524 cp at 190° C. and, when used as an adhesive without additives, exhibited a set time of 3.5 seconds and 80% fiber tear at 20-25° C. using file folder as a substrate. When formulated with 2 wt % of Escorez® 5637 tackifier and 5 wt % of Paraflint H1 wax, copolymer of Example 71 provided an adhesive with a set time of 2 seconds and 90% fiber tear at 20-25° C. on a file folder. However, the formulated adhesive would have no fiber tear and poor adhesion at low temperature (−18° C.) on difficult substrates such as Inland paper board.

According to the present invention, there is provided an in-reactor blend of propylene copolymers in which the composition and properties of the individual components are controlled so that the resultant blend, when combined with small quantities of wax and/or a functionalized polyolefin, exhibits an excellent balance of adhesive properties, including a good low temperature (−18° C.) adhesion performance, short set time and a high toughness at relatively low application-viscosity.

SUMMARY

In one aspect, the present invention resides in an in-reactor produced multi-component copolymer comprising a semi-crystalline component having a crystallinity of 20% or more, and an amorphous component having a crystallinity of 5% or less, wherein the copolymer comprises at least 80 wt % of units derived from propylene and from about 1 to about 20 wt % of units derived from at least one $C_6$ to $C_{12}$ alpha-olefin, and wherein the copolymer has a viscosity at 190° C. of at least 530 mPa sec and a heat of fusion between about 10 and about 70 J/g.

Conveniently, said copolymer has a viscosity at 190° C. of between 600 and 25,000 mPa sec.

Conveniently, said copolymer has a heat of fusion between about 10 and about 60 J/g, such as between about 20 and about 50 J/g.

Conveniently, said copolymer has an Mw/Mn of at least 4, preferably from 4 to 9.

In one embodiment, the multi-component copolymer also comprises polypropylene homopolymer component.

In a further aspect, the invention resides in a process for producing a multi-component copolymer comprising at least 80 wt % of units derived from propylene and up to 20 wt % of units derived from at least one $C_6$ to $C_{12}$ alpha-olefin, the process comprising:

(a) polymerizing propylene and one or more $C_6$ to $C_{12}$ alpha-olefins in a first reaction zone in the presence of a first catalyst system to produce a first polymer product, wherein the first catalyst system comprises a first polymerization catalyst capable of producing a semi-crystalline poly-alpha-olefin having a crystallinity of 20% or more, and a second polymerization catalyst capable of producing an amorphous poly-alpha-olefin having a crystallinity of 5% or less; and (b) contacting the first polymer product under polymerization conditions with a second catalyst system in a second reaction zone separate from the first reaction zone.

Conveniently, additional propylene is supplied to said second reaction zone.

In one embodiment, the second catalyst system is the same as the first catalyst system.

In yet a further aspect, the invention resides in a process for preparing a copolymer comprising at least 80 wt % of units derived from propylene and up to 20 wt % of units derived from at least one $C_6$ to $C_{12}$ alpha-olefin, the process comprising:

(a) polymerizing propylene and one or more $C_6$ to $C_{12}$ alpha-olefins in a first reaction zone in the presence of a first catalyst system capable of producing semi-crystalline copolymer having a crystallinity of 20% or more; and (b) contacting the semi-crystalline copolymer product with propylene in a second reaction zone separate from the first reaction zone and in the presence of a second catalyst system to produce said copolymer, the second catalyst system comprising a first polymerization catalyst capable of producing a crystalline poly-alpha-olefin having a crystallinity of 20% or more, and a second polymerization catalyst capable of producing an amorphous poly-alpha-olefin having a crystallinity of 5% or less.

In still yet a further aspect, the invention resides in a process for preparing a copolymer comprising at least 80 wt % of units derived from propylene and up to 20 wt % of units derived from at least one $C_6$ to $C_{12}$ alpha-olefin, the process comprising:

(a) polymerizing propylene in a first reaction zone in the presence of a first catalyst system to produce a first polymer product; and (b) contacting the first polymer product with propylene and one or more $C_6$ to $C_{12}$ alpha-olefins in a second reaction zone separate from the first reaction zone and in the presence of a second catalyst system to produce said copolymer, the second catalyst system comprising a first polymerization catalyst capable of producing a crystalline poly-alpha-olefin having a crystallinity of 20% or more, and a second polymerization catalyst capable of producing an amorphous poly-alpha-olefin having a crystallinity of 5% or less.

Conveniently, the copolymer comprises about 1 wt % to about 15 wt %, such as about 2 wt % to about 12 wt %, for example about 3 wt % to about 10 wt %, of units derived from said at least one $C_6$ to $C_{12}$ alpha-olefin.

Conveniently, said at least one alpha-olefin has 6 to 10 carbon atoms, more preferably 6 to 8 carbon atoms and most preferably comprises hexene-1.

In another aspect the invention resides in an adhesive composition comprising a multi-component copolymer comprising a semi-crystalline component having a crystallinity of 20% or more, and an amorphous component having a crystallinity of 5% or less, wherein the copolymer comprises at least 80 wt % of units derived from propylene and from about 1 to about 20 wt % of units derived from at least one $C_6$ to $C_{12}$ alpha-olefin, wherein the copolymer has a viscosity at 190° C. of at least 530 mPa sec and a heat of fusion between about 10 and about 70 J/g, and wherein the adhesive composition has the following properties:
  (a) at least 50% fiber tear at −18° C. used Inland paper board as a substrate;
  (b) at least 50% fiber tear at 20° C. used Inland paper board as a substrate;
  (c) a viscosity of less than 1,200 mPa sec at 190° C.;
  (d) a set time of less than 3 seconds; and
  (e) a toughness of at least 3.4 megajoule/m$^3$.

In yet another aspect the invention resides in an adhesive composition comprising a multi-component copolymer comprising a semi-crystalline component having a crystallinity of 20% or more, and an amorphous component having a crystallinity of 5% or less, wherein the copolymer comprises at least 80 wt % of units derived from propylene and from about 1 to about 20 wt % of units derived from at least one $C_6$ to $C_{12}$ alpha-olefin, wherein the copolymer has a viscosity at 190° C. of at least 530 mPa sec and a heat of fusion between about 10 and about 70 J/g, and wherein the adhesive composition has the following properties
  (a) a viscosity of less than 25,000 mPa sec at 190° C.;
  (b) a Dot T-Peel adhesion of at least 10 Newton for adhesion between a fiber board and a fabric substrate;
  (c) a set time of 10 seconds or less;
  (d) an open time of 3 seconds or longer;
  (e) a toughness of at least 7 megajoule/m$^3$, preferably at least 14 megajoule/m$^3$; and
  (f) an elongation of at least 400%.

In still yet another aspect the invention resides in an adhesive composition comprising a multi-component copolymer comprising a semi-crystalline component having a crystallinity of 20% or more, and an amorphous component having a crystallinity of 5% or less, wherein the copolymer comprises at least 80 wt % of units derived from propylene and from about 1 to about 20 wt % of units derived from at least one $C_6$ to $C_{12}$ alpha-olefin, wherein the copolymer has a viscosity at 190° C. of at least 530 mPa sec and a heat of fusion between about 10 and about 70 J/g, and wherein the adhesive composition has the following properties:
  (a) a viscosity of 25,000 mPa sec. or less sec at 190° C.;
  (b) a Dot T-Peel adhesion of at least 10 Newton for adhesion between two polyethylene terephthalate (PET) films at room temperature (25° C.);
  (c) a Dot T-Peel adhesion of at least 10 Newton for adhesion between two PET films at 40° C.;
  (d) a toughness of at least 7 megajoule/m$^3$, preferably at least 14 megajoule/m$^3$; and
  (e) an elongation of at least 400%.

DETAILED DESCRIPTION

For purposes of this invention and the claims thereto when a polymer or oligomer is referred to as comprising an olefin, the olefin present in the polymer or oligomer is the polymerized or oligomerized form of the olefin, respectively. Likewise, the use of the term "polymer" is meant to encompass homopolymers and copolymers. The term "copolymer" is used herein to include any polymer having two or more monomers. For example, in the case of a propylene copolymer, at least one other comonomer is polymerized with the propylene to make the copolymer.

For the purpose of this invention and the claims thereto, the term "multi-component copolymer" is intended to mean a mixture of polymers produced in a plurality of polymerization zones in the same polymerization process/system without the need post polymerization blending (although the resultant copolymer can undergo post polymerization blending, for example, to incorporate modifiers and additives). Each polymer component in the mixture possesses a unique molecular structure such as percent comonomer content, weight averaged molecular weight and/or presence of cross-product. Polymerization zone is defined as an area wherein the activated catalysts and monomers are contacted and polymerization reaction takes place.

As used herein "semi-crystalline polymer" is defined to be an olefin polymer having a crystallinity of more than 20%. As used herein an amorphous polymer is defined to be an olefin polymer having a crystallinity of less than 5% as determined by DSC described below. Melting point (Tm), peak crystallization temperature (Tc), heat of fusion (Hf) and percent crystallinity are, determined using the following procedure according to ASTM E 794-85. Differential scanning calorimetric (DSC) data is obtained using a TA Instruments model 2910 machine or a Perkin-Elmer DSC 7 machine. In the event that the TA Instruments 2910 machine and the Perkin-Elmer DSC-7 machine produce different DSC data, the data from the TA Instruments model 2910 shall be used. Samples weighing approximately 5-10 mg are sealed in aluminum sample pans. The DSC data is recorded by first cooling the sample to −50° C. and then gradually heating it to 200° C. at a rate of 10° C./minute. The sample is kept at 200° C. for 5 minutes before a second cooling-heating cycle is applied. Both the first and second cycle thermal events are recorded. Areas under the melting curves are measured and used to determine the heat of fusion and the degree of crystallinity. The percent crystallinity (X %) is calculated using the formula, X %=[area under the curve (Joules/gram)/B(Joules/gram)]*100, where B is the heat of fusion for the homopolymer of the major monomer component. These values for B are to be obtained from the Polymer Handbook, Fourth Edition, published by John Wiley and Sons, New York 1999. A value of 189 J/g (B) is used as the heat of fusion for 100% crystalline polypropylene. For the semi-crystalline polymers, having appreciable crystallinity, the melting temperature is typically measured and reported during the second heating cycle (or second melt). For the amorphous polymers, having comparatively low levels of crystallinity, the melting temperature is typically measured and reported during the first heating cycle. Prior to the DSC measurement, the sample is aged (typically by holding it at ambient temperature for a period up to about 2 days) or annealed to maximize the level of crystallinity.

The nature of a semi-crystalline copolymer is also reflected in its melting point. The term "melting point," as used herein, for the present multi-component copolymer, is the highest temperature peak among principal and secondary melting peaks as determined by DSC, discussed above. In one embodiment of the present invention, the polymer has a single melting peak. Typically, a sample of propylene copolymer will show secondary melting peaks adjacent to the principal peak, which peaks are considered together as a single melting point. The highest of these peaks is considered the melting point. The present multi-component copolymer preferably has a melting point by DSC ranging from an upper limit of 130° C., 120° C., 110° C., 100° C., or 90° C., to a lower limit of 20° C., 30° C., 40° C., or 50° C.

Disclosed herein is an in-reactor produced multi-component copolymer comprising a semi-crystalline component having a crystallinity of 20% or more, and an amorphous component having a crystallinity of 5% or less. The copolymer comprises at least 80 wt % of units derived from propylene and from about 1 to about 20 wt % of units derived from at least one $C_6$ to $C_{12}$ alpha-olefin. In addition, the copolymer has a viscosity at 190° C. of at least 530 mPa sec, typically between about 600 and about 25,000 mPa sec. and a heat of fusion between about 10 and about 70 J/g, for example between about 10 and about 60 J/g, such as between about 20 and about 50 J/g.

Also disclosed here is a process for producing such a multi-component copolymer by polymerizing propylene in a first reaction zone in the presence of a first catalyst system to produce a first polymer product and then contacting the first polymer product, normally with additional propylene, in a second reaction zone in the presence of a second catalyst system, wherein said at least one $C_6$ to $C_{12}$ alpha-olefin is introduced into at least one of the first and second reaction zones. At least one, and normally both of the first and second catalyst systems, comprises a first polymerization catalyst capable of producing a crystalline poly-alpha-olefin having a crystallinity of 20% or more, and a second polymerization catalyst capable of producing an amorphous poly-alpha-olefin having a crystallinity of 5% or less. In some embodiments, the $C_6$ to $C_{12}$ alpha-olefin is introduced, but in differing amounts, into both of the first and second reaction zones. By controlling the amounts of propylene and $C_6$ to $C_{12}$ alpha-olefin fed to each reaction zone, it is possible to produce a multi-component copolymer in which the various components have different molecular structures such that the overall composition exhibits the desired combination of adhesive properties.

It is to be appreciated that in a system with multiple catalysts, a polymer chain with reactive terminal groups derived from one catalyst can be incorporated into another polymer chain derived from another catalyst to form a branched cross-product. For example, a semi-crystalline propylene copolymer derived from a first catalyst can be incorporated into an amorphous propylene copolymer derived from a second catalyst to form a branched cross-product with both amorphous and semi-crystalline characteristics. In a process using multiple polymerization zones, polymer chains with reactive terminal groups produced in a first polymerization zone can flow over into a subsequent polymerization zone wherein the reactive polymer chains can be incorporated into growing polymer chains to form branched cross-products. The branched cross-products are also referred to as branch-block polymers.

To effectively incorporate a reactive polymer chain into the growing chains of another polymer, it is preferable that the first polymerization step produces macromonomers having reactive termini, such as vinyl end groups. By macromonomers having reactive termini is meant a polymer having twelve or more carbon atoms (preferably 20 or more, more preferably 30 or more, more preferably between 12 and 8000 carbon atoms) and having a vinyl, vinylidene, vinylene or other terminal group that can be polymerized into a growing polymer chain. By capable of polymerizing macromonomer having reactive termini is meant a catalyst component that can incorporate a macromonomer, having reactive termini into a growing polymer chain. Vinyl terminated chains are generally more reactive than vinylene or vinylidene terminated chains. Generally, it is desirable that the first polymerization step produces a first polymer having at least 0.01% terminal unsaturation.

Branch-block polymer has lower viscosity in polymer solution as compared with its linear counter part with same molecular weight. The degree of branch-block polymer is measured by the viscosity ratio (g') of the branch-block polymer to linear polymer as described later. Preferably, g' is less than 0.95 as measured at Mz in a GPC trace.

Copolymer

The present copolymer is an in-reactor produced multi-component propylene copolymer comprising a semi-crystalline component having a crystallinity of 20% or more and an amorphous component having a crystallinity of 5% or less, optionally together with a polypropylene homopolymer component.

The copolymer comprises at least 80 wt % of units derived from propylene and from about 1 to about 20 wt %, such as from about 1 to about 15% by weight, for example from about 2% to about 12% by weight, and typically from about 3% to about 10% by weight of units derived from at least one $C_6$ to $C_{12}$ alpha-olefin. Preferred $C_6$ to $C_{12}$ alpha-olefins are those having 6 to 8 carbon atoms, with the most preferred alpha-olefin being hexene-1.

The copolymer can contain small amounts, generally less than 10% by weight of units derived from other comonomers, such as ethylene, $C_4$ and $C_5$ alpha-olefins and $C_{11}$ to $C_{20}$ alpha-olefins, but preferably the copolymer consists essentially of units derived from propylene and units derived from one or more $C_6$ to $C_{12}$ alpha-olefins. In particular, the copolymer is preferably free of diolefins.

The semi-crystalline component of the copolymer typically has a melting point of less than 130° C., or preferably less than 120° C., and preferably has a heat of fusion of less than 75 J/g as determined by DSC. This melting point is due to crystallizable propylene sequences, preferably of isotactic polypropylene. The semi-crystalline copolymer has stereoregular propylene sequences long enough to crystallize, preferably predominately isotactic polypropylene. The length and distribution of stereoregular propylene sequences is consistent with the substantially random statistical copolymerization. It is well known that sequence length and distribution are related to the copolymerization reactivity ratios. By substantially random, we mean copolymer for which the product of the reactivity ratios is 2 or less. In stereoblock structures, the average length of polypropylene sequences is greater than that of substantially random copolymers with a similar composition. Prior art polymers with stereoblock structure have a distribution of polypropylene sequences consistent with these blocky structures rather than a random substantially statistical distribution. The reactivity ratios and sequence distribution of the polymer can be determined by C-13 NMR which locates the comonomer residues in relation to the neighboring propylene residues. This is according to the procedures described in the article by H. Kakugo, Y Naito, K. Mizunama and T. Miyatake in Macromolecules (1982), pages 1150-1152.

The weight averaged molecular weight of the semi-crystalline copolymer can be between 5,000 to 100,000, preferably between 10,000 to 70,000 with a polydispersity index (PDI) in a range of 1.5 to 40. The polydispersity index is partially determined by the catalysts employed in the polymerization process. Polymerization involving multiple catalysts may produce copolymer with broader molecular weight distribution. Preferably, the semi-crystalline copolymer has a viscosity of less than 50,000 mPa sec measured at 190° C. using a Brookfield viscometer.

The amorphous component of the in-reactor produced multi-component copolymer includes a copolymer of propylene and at least one $C_6$ to $C_{12}$ alpha-olefin, preferably hexene-1, optionally in combination with amorphous polypropylene. The amorphous nature of this component generally derives from the presence of atactic propylene sequences and/or the interruption of isotactic propylene sequences through comonomer incorporation. The percentage of the copolymerized alpha-olefin in the amorphous copolymer is, in general, in a range of 2 to 15 wt %, alternatively 3% to 10 wt %. One, two or more alpha-olefins can be copolymerized with propylene.

The amorphous phase of the in-reactor produced multi-component copolymer may be a combination of homopolypropylene and propylene copolymer.

The weight averaged molecular weight of the amorphous copolymer can be between 1,000 to 100,000, preferably between 5,000 to 70,000 with a polydispersity index (PDI) in a range of 1.5 to 40. The polydispersity index is partially determined by the catalysts employed in the polymerization process. Polymerization involving multiple catalysts may produce copolymer with broader molecular weight distribution. Preferably, the amorphous copolymer has a viscosity of less than 50,000 mPa sec measured at 190° C. using a Brookfield viscometer.

The amount of the semi-crystalline propylene copolymer relative to the amorphous propylene copolymer may vary widely depending on the nature of the polymer and intended end use of the polymer mixture. In particular, however, one advantage of the present process is the ability to be able to produce a polymer mixture in which the semi-crystalline propylene copolymer comprises more than 20%, such as more than 50%, for example more than 70% of the total in-reactor produced multi-component copolymer. For packaging adhesive applications, the weight ratio of semi-crystalline propylene copolymer to amorphous propylene copolymer is generally from about 90:10 to about 30:70.

The optional polypropylene homopolymer component of the in-reactor produced multi-component copolymer may be isotactic, highly isotactic, syndiotactic, or highly syndiotactic polypropylene. In one embodiment, the polypropylene is an isotactic polypropylene. In another embodiment, the polypropylene is a highly isotactic polypropylene. As used herein, "isotactic" is defined as having at least 10% isotactic pentads, preferably having at least 40% isotactic pentads of methyl groups derived from propylene according to analysis by C13-NMR. As used herein, "highly isotactic" is defined as having at least 60% isotactic pentads according to analysis by C13-NMR.

Useful polypropylene has a crystallinity of at least 40%, more preferably at least 70% as determined by DSC. The term "crystalline" as used herein, characterizes those polymers that possess high degrees of inter- and intra-molecular order in the solid state. Heat of fusion, a measure of crystallinity, greater than 60 J/g, alternatively at least 70 J/g, alternatively at least 80 J/g, alternatively at least 90 J/g, as determined by DSC analysis, is preferred.

The multi-component copolymer typically comprises less than 15 weight %, and generally less than 10 weight % of the polypropylene homopolymer component (based upon the total weight of the in-reactor produced polymer mixture).

The composition distribution of the in-reactor produced multi-component copolymer is determined by thermal fractionation in a solvent. A typical solvent is a saturated hydrocarbon such as hexane, heptane or xylene. Selection of the specific solvent depends on the crystallinity and molecular weight of the in-reactor produced multi-component copolymer. Multiple steps of solvent extraction may be required to separate the multi-component system.

In one embodiment, the in-reactor produced multi-component copolymer has a viscosity of less than 50,000 mPa sec, typically between about 600 and about 25,000 mPa sec, measured at 190° C. using a Brookfield viscometer, a weight averaged molecular weight of less than 100,000, preferably less than 70,000, more preferably less than 50,000, more preferably less than 40,000. Generally, the ratio of the weight averaged molecular weight (Mw) of the copolymer to the number averaged molecular weight (Mn) of the copolymer is at least 4, such as between about 4 and about 9, for example between about 5 and about 7.

In another embodiment, the in-reactor produced multi-component copolymer has a heat of fusion between about 10 J/g, for example between about 10 and about 60 J/g, such as between about 20 and about 50 J/g and a melting temperature of less than 140° C., such as less than 130° C., for example less than 120° C.

In one embodiment, the in-reactor produced multi-component copolymer has two-phase morphology as observed by atomic force microscopy (AFM). Such morphology leads to enhancement in the elastic recovery properties of the copolymer.

Process for Producing the Copolymer

The copolymer described herein may be produced by copolymerizing propylene and one or more $C_6$ to $C_{12}$ alpha-olefins in the presence of multiple component catalyst system. Moreover, although the polymerization can be conducted in a single reaction zone, generally multiple reaction zones are used. In one embodiment, propylene and one or more $C_6$ to $C_{12}$ alpha-olefins are polymerized in the presence of first and second polymerization catalysts in a first reaction zone and then the mixture from the first polymerization step is contacted with a further polymerization catalyst and generally with additional propylene in a second reaction zone separate from the first reaction zone. The first polymerization catalyst is capable of producing a crystalline poly-alpha-olefin, preferably isotactic polypropylene or syndiotactic polypropylene, having a crystallinity of 20% or more, and a second polymerization catalyst is capable of producing an amorphous poly-alpha-olefin having a crystallinity of 5% or less. The molar ratio of the first polymerization catalyst to the second polymerization catalyst is generally from 5:95 to 95:5 depending on the application and other process variables.

The further polymerization catalyst employed in the second reaction zone may comprise a catalyst capable of producing a crystalline poly-alpha-olefin having a crystallinity of 20% or more, a catalyst capable of producing an amorphous poly-alpha-olefin having a crystallinity of 5% or less, or a mixture of both types of catalyst.

Generally between about 30% and about 90%, preferably between about 40% and about 80%, more preferably between about 50% and about 70%, and most preferably between about 45% and about 55% of the total propylene is supplied to the first reaction zone, with the remainder being supplied to the second reaction zone. Typically at least 70%, preferably at least 80%, more preferably at least 90%, and most preferably 100% of the total $C_6$ to $C_{12}$ alpha-olefin is supplied to the first reaction zone, with any remainder being supplied to the second reaction zone. Generally, the molar ratio of propylene to the $C_6$ to $C_{12}$ alpha-olefin in the first reaction zone is different from that in the second reaction zone.

In one embodiment, the conversion of the $C_6$ to $C_{12}$ alpha-olefins in the first reaction zone is controlled to be above 90%, preferably above 95%, so that propylene copolymer with high melting temperature can be produced in the second reaction zone. The preferred melting temperature of the polymer produced in the second reaction zone is greater than 100° C., more preferably greater than 120° C.

The in-reactor produced multi-component copolymer can be also produced by contacting propylene alone in a first reaction zone with a first polymerization catalyst capable of producing a crystalline polypropylene having a crystallinity of 20% or more. The contents of the first reaction zone are then transferred into a separate second reaction zone together with one or more $C_6$ to $C_{12}$ alpha-olefins and optionally with additional propylene so as to produce amorphous and semi-crystalline propylene copolymers in the presence of polypropylene produced. The second reaction zone employs a catalyst system including the first polymerization catalyst, and a second polymerization catalyst capable of producing an amorphous poly-alpha-olefin having a crystallinity of 5% or less. The resultant intimate mixing among the different components of the in-reactor produced multi-component copolymer provides excellent interface bonding and enhanced mechanical properties. Generally between about 30% and about 90%, preferably between about 40% and about 80%, more preferably between about 50% and about 70%, and most preferably between about 45% and about 55% of the total propylene is supplied to the first reaction zone, with the remainder being supplied to the second reaction zone. In another embodiment, all propylene is fed into the first reaction zone.

In an alternative embodiment, the in-reactor produced multi-component copolymer can be produced by contacting propylene and one or more $C_6$ to $C_{12}$ alpha-olefins in a first reaction zone with a first polymerization catalyst capable of producing a crystalline polypropylene having a crystallinity of 20% or more, and then supplying the contents of the first reaction zone together with additional propylene into a separate second reaction zone wherein the amorphous and semi-crystalline propylene copolymers are produced in the presence of propylene copolymer produced. The second reaction zone employs a catalyst system including the first polymerization catalyst, and a second polymerization catalyst capable of producing an amorphous poly-alpha-olefin having a crystallinity of 5% or less. The resultant intimate mixing among the different components of the in-reactor produced multi-component copolymer provides excellent interface bonding and enhanced mechanical properties. Generally between about 30% and about 90%, preferably between about 40% and about 80%, more preferably between about 50% and about 70%, and most preferably between about 45% and about 55% of the total propylene is supplied to the first reaction zone, with the remainder being supplied to the second reaction zone. All of the $C_6$ to $C_{12}$ alpha-olefins is supplied to the first reaction zone. The conversion of one or more $C_6$ to $C_{12}$ alpha-olefins in the first reaction zone is controlled to be above 90 wt %, preferably above 95 wt %, so that the propylene copolymer with high crystallinity can be produced in the second reaction zone.

It is to be appreciated that, although the foregoing discussion refers only to first and second polymerization zones, further reaction zones could be employed, with the feed to the second reaction zone being split between the additional reaction zones. However, from an economic viewpoint, such additional reaction zones are not currently preferred.

Any known polymerization process may be used to produce the present propylene copolymer. Polymerization methods include high pressure, slurry, gas, bulk, suspension, supercritical, or solution phase, or a combination thereof, using a single-site metallocene catalyst system. The catalysts can be in the form of a homogeneous solution, supported, or a combination, thereof. Polymerization may be carried out by a continuous, a semi-continuous or batch process and may include use of chain transfer agents, scavengers, or other such additives as deemed applicable. By continuous is meant a system that operates (or is intended to operate) without interruption or cessation. For example a continuous process to produce a polymer would be one where the reactants are continually introduced into one or more reactors and polymer product is continually withdrawn.

A wide variety of transition metals compounds are known that, when activated with a suitable activator, will polymerize alpha-olefins selectively to produce either crystalline polymers or amorphous polymers. For a full discussion of such compounds reference is directed to International Patent Publication No. WO 2004/046214, published Jun. 3, 2004, the entire contents of which are incorporated herein by reference.

Preferably the semi-crystalline copolymer is made with a polymerization catalyst which forms essentially or substantially isotactic propylene sequences. Nonetheless, the polymerization catalyst used for the production of the semi-crystalline propylene copolymer will introduce stereo- and regio-errors in the incorporation of propylene. Stereo errors are those where the propylene inserts in the chain with a tacticity that is not isotactic. Propylene molecules are usually added head-to-tail and not tail-to-tail or head-to-head. Head-to-tail addition results in a polypropylene chain with pendant methyl groups attached to alternating carbons. This alternating arrangement is disrupted when tail-to-tail or head-to head addition occurs, A regio error is one where the propylene inserts with the methylene group or the methine group adjacent to a similar group in the propylene inserted immediately prior to it. Such errors are more prevalent after the introduction of comonomer such as 1-hexene in the semi-crystalline propylene copolymer. While not wishing to be bounded by this theory, it is believed that the introduction of these errors in the introduction of propylene, particularly in the presence of comonomer, is important in the use of these propylene copolymers as the semi-crystalline propylene copolymer. Notwithstanding the presence of these errors, the semi-crystalline propylene copolymer is statistically random in the distribution of comonomer.

Preferably the semi-crystalline propylene copolymer is made with a single site metallocene catalyst which allows only a single statistical mode of addition of propylene and comonomer in a well-mixed, continuous monomer feed stirred tank polymerization reactor and which allows only a single polymerization environment for all of the polymer chains of the semi-crystalline propylene copolymer.

Suitable transition metal compounds capable of producing crystalline poly-alpha-olefins include those obeying the following general formula (1):

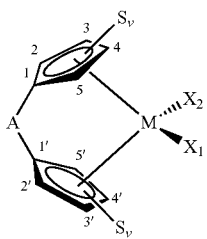

wherein

M is a Group 3, 4, 5 or 6 transition metal atom, or a lanthanide metal atom, or actinide metal atom, preferably a Group 4 transition metal atom selected from titanium, zirconium or hafnium;

each cyclopentadienyl (Cp) ring is substituted with from zero to four substituent groups $S_v$, each substituent group $S_v$ being, independently, a hydrocarbyl, substituted-hydrocarbyl, halocarbyl, substituted-halocarbyl, hydrocarbyl-substituted organometalloid, halocarbyl-substituted organometalloid, disubstituted boron, disubstituted pnictogen, substituted chalcogen or halogen radical, provided that two adjacent $S_v$ groups may be joined to form a $C_4$ to $C_{20}$ ring to give a saturated or unsaturated polycyclic ligand, wherein the subscript "v" denotes the carbon atom on the Cp-ring to which the substituent is bonded;

A is a bridging group; and $X_1$ and $X_2$ are, independently, hydride radicals, hydrocarbyl radicals, substituted hydrocarbyl radicals, halocarbyl radicals, substituted halocarbyl radicals, and hydrocarbyl- and halocarbyl-substituted organometalloid radicals, substituted pnictogen radicals, or substituted chalcogen radicals; or $X_1$ and $X_2$ are joined and bound to the metal atom to form a metallacycle ring containing from about 3 to about 20 carbon atoms; or $X_1$ and $X_2$ together can be an olefin, diolefin or aryne ligand; or when Lewis-acid activators, such as methylalumoxane, which are capable of donating an $X_1$ ligand as described above to the transition metal component are used, $X_1$ and $X_2$ may independently be a halogen, alkoxide, aryloxide, amide, phosphide or other univalent anionic ligand or both $X_1$ and $X_2$ can also be joined to form a anionic chelating ligand and with the proviso that $X_1$ and $X_2$ are not a substituted or unsubstituted cyclopentadienyl ring.

Conveniently, A is a bridging group containing boron or a Group 14, 15 or 16 element. Examples of suitable bridging groups include $R'_2C$, $R'_2Si$, $R'_2Ge$, $R'_2CCR'_2$, $R'_2CCR'_2CR'_2$, $R'_2CCR'_2CR'_2CR'_2$, $R'C=CR'$, $R'C=CR'CR'_2$, $R'_2CCR'=CR'CR'_2$, $R'C=CR'CR'=CR'$, $R'C=CR'CR'_2CR'_2$, $R'_2CSiR'_2$, $R'_2SiSiR'_2$, $R'_2CSiR'_2CR'_2$, $R'_2SiCR'_2SiR'_2$, $R'C=CR'SiR'_2$, $R'_2CGeR'_2$, $R'_2GeGeR'_2$, $R'_2CGeR'_2CR'_2$, $R'_2GeCR'_2GeR'_2$, $R'_2SiGeR'_2$, $R'C=CR'GeR'_2$, $R'B$, $R'_2C-BR'$, $R'_2C-BR'-CR'_2$, $R'N$, $R'P$, O, S, Se, $R'_2C-O-CR'_2$, $R'_2CR'_2C-O-CR'_2CR'_2$, $R'_2C-O-CR'_2CR'_2$, $R'_2C-O-CR'=CR'$, $R'_2C-S-CR'_2$, $R'_2CR'_2C-S-CR'_2CR'_2$, $R'_2C-S-CR'_2CR'_2$, $R'_2C-S-CR'=CR'$, $R'_2C-Se-CR'_2$, $R'_2CR'_2C-Se-CR'_2CR'_2$, $R'_2C-Se-CR'_2CR'_2$, $R'_2C-Se-CR'=CR'$, $R'_2C-N=CR'$, $R'_2C-NR'-CR'_2$, $R'_2C-NR'-CR'_2CR'_2$, $R'_2C-NR'-CR'=CR'$, $R'_2CR'_2C-NR'-CR'_2CR'_2$, $R'_2C-P=CR'$, and $R'_2C-PR'-CR'_2$ where R' is hydrogen or a $C_1$-$C_{20}$ containing hydrocarbyl, substituted hydrocarbyl, halocarbyl, substituted halocarbyl, silylcarbyl or germylcarbyl substituent and optionally two or more adjacent R' may join to form a substituted or unsubstituted, saturated, partially unsaturated or aromatic, cyclic or polycyclic substituent. Preferred examples for the bridging group Y include $CH_2$; $CH_2CH_2$, $CH(CH_3)_2$, O, S, $SiMe_2$, $SiPh_2$, $SiMePh$, $Si(CH_2)_3$ and $Si(CH_2)_4$.

Preferably transition metal compounds for producing poly-alpha-olefins having enhanced isotactic character are those of formula 1 where the $S_v$ groups are independently chosen such that the metallocene framework 1) has no plane of symmetry containing the metal center, and 2) has a $C_2$-axis of symmetry through the metal center. These complexes, such as rac-$Me_2Si(indenyl)_2ZrMe_2$ and rac-$Me_2Si(indenyl)_2HfMe_2$, are well known in the art and generally produce isotactic polymers with high degrees of stereoregularity. Similarly another preferred class of transition metal compounds that can produce isotactic polymers useful in this invention are the monocyclopentadienyl catalysts disclosed in U.S. Pat. No. 5,026,798, which is incorporated by reference herein. A detailed description of suitable catalyst compounds and catalyst selections may be found in U.S. Published Patent Application No. 2004/0217614, published Jul. 1, 2004, which is incorporated by reference herein.

Similarly, transition metal compounds providing tacticity control exist where the $S_v$ substituents of sufficient steric bulk to restrict rotation of the cyclopentadienyl ligands such that the aforementioned symmetry conditions are satisfied. Preferable chiral racemic metallocenes of this type include bis(tricyclo[5.2.1.0$^{2,6}$]deca-2,5-dienyl)zirconium and -hafnium dimethyl, bis((1R)-9,9-dimethyltricyclo[6.1.1.0$^{2,6}$]deca-2,5-dienyl)zirconium dimethyl, bis(tricyclo[5.2.1.0$^{2,6}$]deca-2,5,8-trienyl)zirconium dimethyl, bis(tricyclo[5.2.2.0$^{2,6}$]undeca-2,5,8-trienyl)zirconium and hafnium dimethyl and bis((1R,8R)-7,7,9,9-tetramethyl[6.1.1.0$^{2,6}$]deca-2,5-dienyl)zirconium and hafnium dimethyl.

Preferably transition metal compounds for the production of poly-alpha-olefins having enhanced syndiotactic character are also those of formula 1 where the $S_v$ substituents are independently chosen such that the Cp ligands have substantially different steric bulk. In order to produce a syndiotactic polymer the pattern of the groups substituted on the Cp-rings is important. Thus, by steric difference or sterically different as used herein, it is intended to imply a difference between the steric characteristics of the A and E ligands that renders each to be symmetrical with respect to the Y bridging group but different with respect to each other thereby controlling the approach of each successive monomer unit that is added to the polymer chain. The steric difference between the A and E ligands act to block the approaching monomer from a random approach such that the monomer is added to the polymer chain in the syndiotactic configuration.

Preferable transition metal compounds for the production of syndiotactic polymers are those of formula 1 where the $S_v$ substituents are independently chosen such that 1) the steric difference between the A and E ligands is maximized and 2) there remains a plane of symmetry through the metal center and the $C_1$ and $C_{1'}$ carbon atoms of the Cp-rings in formula 1. Thus, complexes such as $Me_2C(\eta^5$-$C_5H_4)(1$-fluorenyl)$MMe_2$ (where M=Ti, Zr, or Hf) which possess this symmetry are preferred, and generally produce the syndiotactic polymer with higher degrees of stereoregularity than similar, but less symmetric, systems. Additionally, in the above equation, 1-fluorenyl may be substituted with 3,8-di-t-butylfluorenyl, octahydrofluorenyl or 3,3,6,6,9,9,12,12-octamethyl-4,4,5,5,10,10,11,11-octahydrodibenzo[b,h]fluorene. Because precatalysts of this type often lose there ability to control the stereoregularity of the polymer under high temperature reaction conditions, to insure higher crystallinity in the material requires using these catalysts at lower reactor temperatures, preferably at temperatures below 80° C.

Particularly preferred transition metal compounds for producing crystalline poly-alpha-olefins are racemic metallocenes, such as rac-dimethylsiladiyl(2-isopropyl,4-phenyl-indenyl)$_2$zirconium dichloride; rac-dimethylsiladiyl(2-isopropyl,4-[1-naphthyl]indenyl)$_2$zirconium dichloride; rac-dimethylsiladiyl(2-isopropyl,4-[3,5-dimethylphenyl]indenyl)$_2$zirconium dichloride; rac-dimethylsiladiyl(2-isopropyl,4-[ortho-methyl-phenyl]indenyl)zirconium dichloride; rac-dimethylsilyl bis-(2-methyl, 4-phenylindenyl)zirconium dichloride, rac dimethylsiladlyl bis-(2-methyl, 4-napthylindenyl)zirconium dichloride, rac-dimethyl siladiyl (2-isopropyl, 4-[3,5 di-t-butyl-phenyl]indenyl)$_2$zirconium dichloride; rac-dimethyl siladiyl(2-isopropyl,4-[orthophenyl-phenyl]indenyl)$_2$zirconium dichloride, rac-diphenylsiladiyl(2-methyl-4-[1-naphthyl]indenyl)$_2$zirconium dichloride and rac-biphenyl siladiyl(2-isopropyl,4-[3,5 di-t-butyl-phenyl]indenyl)$_2$zirconium dichloride. Alkylated variants of these metallocenes (e.g. di-methyl instead of dichloride) are also contemplated, dictated by the choice of catalyst activation system. These and other metallocene compositions are described in detail in U.S. Pat. Nos. 6,376,407, 6,376,408, 6,376,409, 6,376,410, 6,376,411, 6,376,412, 6,376,413, 6,376,627, 6,380,120, 6,380,121, 6,380,122, 6,380,123, 6,380,124, 6,380,330, 6,380,331, 6,380,334, 6,399,723 and 6,825,372.

The preferred choice of transition metal compounds for producing the amorphous polymer fraction are mono-cyclopentadienyl transition metal compounds obeying the formula (2):

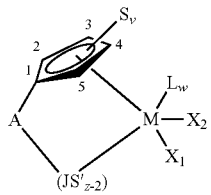

wherein

M is a Group 3, 4, 5 or 6 transition metal atom, or a lanthanide metal atom, or actinide metal atom, preferably a Group 4 transition metal atom selected from titanium, zirconium or hafnium;

$S_v$ is the same as in formula 1 where the subscript "v" denotes the carbon atom on the cyclopentadienyl ring to which the substituent is bonded and where there can be zero, two or four substituents, $S_v$, on the cyclopentadienyl ring provided that the cyclopentadienyl ring is symmetrically substituted (as defined below); $(JS'_{z-2})$ is a heteroatom ligand in which J is an element from Group 15 of the Periodic Table of Elements with a coordination number of 3 or an element from Group 16 with a coordination number of 2, S' is a radical group which is a hydrocarbyl, substituted hydrocarbyl, halocarbyl, substituted halocarbyl, hydrocarbyl-substituted organometalloid, or halocarbyl-substituted organometalloid; and z is the coordination number of the element J;

A is a bridging group as defined above;

$X_1$ and $X_2$ are the same as in formula 1;

L is an olefin, diolefin, aryne, amine, phosphine, ether, or sulfide ligand, or any other neutral Lewis base; provided L can also be a second transition metal compound of the same type such that the two metal centers M and M* are bridged by $X_1$ and $X'_1$, wherein M* has the same meaning as M, $X'_1$ has the same meaning as $X_1$, and w is an integer from 0 to 3.

"Symmetrically substituted" in relation to the S ligands in formula (2) is defined to mean that the cyclopentadienyl ring is substituted in the 2 and 5 positions and/or 3 and 4 positions with $S_v$ groups that are of approximately of the same steric bulk. Typically the size of these $S_v$ groups is within 2 carbons of each other. Thus a cyclopentadienyl substituted at the 2 and the 5 positions with methyl and ethyl respectively, or substituted at the 3 and the 4 positions with hexyl and octyl, respectively, would be considered symmetric. Likewise, the cyclopentadienyl ring may be substituted at all four sites with $S_v$ groups and be considered symmetric as long as each of the symmetrical pairs is of similar steric bulk. Additionally, two adjacent $S_v$ groups in the 3 and 4 position may be linked to form a ring provided that the new ring is also symmetrically substituted.

Catalyst systems including transition metal compounds of the type defined by formula (2) are known to impart 2,1-mistakes when incorporating C3 and higher alpha-olefins. The compounds where S' is bonded to a nitrogen ligand (J) via a tertiary carbon (for example when S' is tert-butyl or 1-adamantyl) have fewer 2,1-mistakes then when S' is bonded to the nitrogen ligand (J) via a primary carbon (for example when S' is n-butyl, methyl, or benzyl) or secondary carbon (for example when S' is cyclododecyl, cyclohexyl, or sec-butyl). The 2,1-mistakes in the polymer backbone impart $(CH_2)_2$ units that can be beneficial to the polymer properties. Polymers of this type, the characterization of such polymers and the catalyst systems used to produce such polymers are described in U.S. Pat. No. 5,723,560, which is incorporated herein by reference. Lower Mw versions of such polymers can be produced by changing process condition, for example, by increasing reactor temperature.

Illustrative, but not limiting examples of preferred mono-cyclopentadienyl metallocenes of the type described in formula (2) above are:

μ-$(CH_3)_2$Si(cyclopentadienyl)(1-adamantylamido)M(R)$_2$

μ-$(CH_3)_2$Si(3-tertbutylcyclopentadienyl)(1-adamantylamido)M(R)$_2$

μ-$(CH_3)_2$Si(tetramethylcyclopentadienyl)(1-adamantylamido)M(R)$_2$

μ-$(CH_3)_2$C(tetramethylcyclopentadienyl)(1-adamantylamido)M(R)$_2$

μ-$(CH_3)_2$Si(tetramethylcyclopentadienyl)(1-tertbutylamido)M(R)$_2$

μ-$(CH_3)_2$Si(fluorenyl)(1-tertbutylamido)M(R)$_2$

μ-$(CH_3)_2$Si(tetramethylcyclopentadienyl)(1-cyclododecylamido)M(R)$_2$

μ-$(CH_3)_2$C(tetramethylcyclopentadienyl)(1-cyclododecylamido)M(R)$_2$ wherein M is selected from a group consisting of Ti, Zr, and Hf and wherein R is selected from Cl and $CH_3$.

Additionally, at higher reaction temperatures, some catalysts that produce syndiotactic poly-alpha-olefin at lower temperatures, will produce virtually non-crystalline poly-alpha-olefins at higher temperatures. Preferred transition metal compounds of this type are illustrated in formula (3):

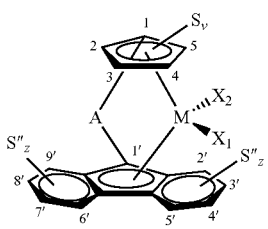

wherein

M is a Group 3, 4, 5 or 6 transition metal atom, or a lanthanide metal atom, or actinide metal atom, preferably a Group 4 transition metal atom selected from titanium, zirconium or hafnium;

$S_v$ is the same as in formula 1 where the subscript "v" denotes the carbon atom on the cyclopentadienyl ring to which the substituent is bonded and where there can be zero, two or four substituents, $S_v$, on the cyclopentadienyl ring provided that the cyclopentadienyl ring is symmetrically substituted (as defined below);

each substituent group S" is, independently, a hydrocarbyl, substituted-hydrocarbyl, halocarbyl, substituted-halocarbyl, hydrocarbyl-substituted organometalloid, halocarbyl-substituted organometalloid, disubstituted boron, disubstituted pnictogen, substituted chalcogen or halogen radical, provided that two adjacent S" groups may joined to form a $C_4$ to $C_{20}$ ring to give a saturated or unsaturated polycyclic ligand;

subscript "z" denotes the carbon atom on the fluorenyl ring to which the substituent is bonded and where there can be zero to seven substituents, S", on the fluorenyl ring; and A is a bridging group as defined above;

"Symmetrically substituted" in relation to the $S_v$ ligands in formula (3) is defined to mean that the cyclopentadienyl ring is substituted in the 2 and 5 positions and/or 3 and 4 positions with $S_v$ groups that are of approximately of the same steric bulk. Typically the sizes of these $S_v$ groups are within 2 carbons of each other. Thus a cyclopentadienyl substituted at the 2 and the 5 positions with methyl and ethyl respectively, or substituted at the 3 and the 4 positions with hexyl and octyl, respectively, would be considered symmetric. Likewise, the cyclopentadienyl ring may be substituted at all four sites with $S_v$ groups and be considered symmetric as long as each of the symmetrical pairs are of similar steric bulk. Additionally, two adjacent $S_v$ groups in the 3 and 4 position may be linked to form a ring provided that the new ring is also symmetrically substituted.

Preferably metallocene precursors for producing poly-alpha-olefins having largely amorphous character (when used as catalysts under higher reactor temperature conditions) are those of formula (3) where $S_v$ are independently chosen such that the metallocene framework has a plane of symmetry containing the metal center and bisecting the Flu- and Cp- rings. The A ligand need not be symmetrical—for example dimethylsilyl or methylphenylsilyl will not effect the stereochemisty of the polymer produced. Because of the distant placement of the S" substituents on the fluorenyl ring, these substituents need not be symmetrically placed on the fluorenyl ring. Hence, the fluorenyl ring may be substituted with up to 7 substituents that may be the same or different.

Illustrative, but not limiting examples of preferred unsymmetrical cyclopentadienyl metallocenes of the type described in formula (3) above for the invention are:

μ-$(C_6H_5)_2$C(cyclopentadienyl)(fluorenyl)M$(R)_2$
μ-$(C_6H_5)_2$C(3-methylcyclopentadienyl)(fluorenyl)M$(R)_2$
μ-$(CH_3)_2$C(cyclopentadienyl)(fluorenyl)M$(R)_2$
μ-$(C_6H_5)_2$C(cyclopentadienyl)(2-methylindenyl)M$(CH_3)_2$
μ-$(C_6H_5)_2$C(3-methylcyclopentadienyl)(2-methylindenyl)M$(Cl)_2$
μ-(p-triethylsilylphenyl)$_2$C(cyclopentadienyl)(3,8-di-t-butylfluorenyl)M$(R)_2$
μ-$(C_6H_5)_2$C(cyclopentadienyl)(2,7-dimethylindenyl)M(R
μ-$(CH_3)_2$C(cyclopentadienyl)(2,7-dimethylindenyl)M(R).

wherein M is chosen from the group consisting of Zr and Hf and R is chosen from the group consisting of Cl and $CH_3$.

Additionally, compounds of formula (4) may be used to produce the amorphous polymer fraction.

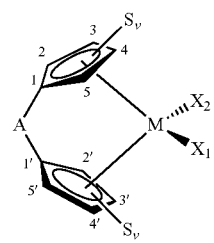

wherein

M is a Group 3, 4, 5 or 6 transition metal atom, or a lanthanide metal atom, or actinide metal atom, preferably a Group 4 transition metal atom selected from titanium, zirconium or hafnium;

$S_v$ is the same as in formula 1 where the subscript "v" denotes the carbon atom on each cycloperitadienyl ring to which the substituent is bonded and where there can be zero to four substituents, $S_v$, on each cyclopentadienyl ring provided that the cyclopentadienyl rings are symmetrically substituted (as defined below);

"Symmetrically substituted" in relation to the $S_v$ ligands in formula (4) is defined to mean that the metallocene framework has a plane of symmetry that bisects M and A. Thus, where the cyclopentadienyl rings include substituents, they should be substituted in the 2 and 2' positions and/or 3 and 3' positions and/or 4 and 4' positions and/or 5 and 5' positions with S groups that are of approximately of the same steric bulk. Typically the sizes of these $S_v$ groups are within 2 carbons of each other. Thus cyclopentadienyl rings substituted at the 2 and the 2' positions with methyl and ethyl respectively, or substituted at the 3 and the 3' positions with hexyl and octyl respectively, would be considered symmetrical. Likewise, the cyclopentadienyl rings may be substituted at all four sites with $S_v$ groups and be considered symmetrical as long as each of the symmetrical pairs are of similar steric bulk. Additionally, two adjacent $S_v$ groups may be linked to form a ring provided that the new ring is also symmetrically substituted.

Illustrative, but not limiting examples of preferred transition metal compounds of formula (4) are the racemic isomers of:

μ-$(CH_3)_2$Si(indenyl)$_2$M$(Cl)_2$
μ-$(CH_3)_2$Si(indenyl)$_2$M$(CH_3)_2$
μ-$(CH_3)_2$Si(tetrahydroindenyl)$_2$M$(Cl)_2$
μ-$(CH_3)_2$Si(tetrahydroindenyl)$_2$M$(CH_3)_2$
μ-$(CH_3)_2$Si(indenyl)$_2$M$(CH_2CH_3)_2$
μ-$(C_6H_5)_2$C(indenyl)$_2$M$(CH_3)_2$ wherein M is chosen from a group consisting of Zr and Hf.

The transition metal compounds described above are typically activated in various ways to yield compounds having a vacant coordination site that will coordinate, insert, and polymerize olefin(s). For the purposes of this patent specification and appended claims, the terms "cocatalyst" and "activator" are used herein interchangeably and are defined to be any compound which can activate any one of the catalyst compounds described above by converting the neutral catalyst compound to a catalytically active catalyst compound cation. Non-limiting activators, for example, include alumoxanes, aluminum alkyls, ionizing activators, which may be neutral or ionic, and conventional-type cocatalysts. Preferred activators typically include alumoxane compounds, modified alumoxane compounds, and ionizing anion precursor compounds that abstract one reactive, σ-bound, metal ligand making the metal complex cationic and providing a charge-balancing noncoordinating or weakly coordinating anion.

Alumoxanes are generally oligomeric compounds containing —Al($R^1$)—O— sub-units, where $R^1$ is an alkyl group. Examples of alumoxanes include methylalumoxane (MAO), modified methylalumoxane (MMAO), ethylalumoxane and isobutylalumoxane. Alkylalumoxanes and modified alkylalumoxanes are suitable as catalyst activators, particularly when the abstractable ligand is a halide, alkoxide or amide. Mixtures of different alumoxanes and modified alumoxanes may also be used.

Alumoxanes may be produced by the hydrolysis of the respective trialkylaluminum compound. MMAO may be produced by the hydrolysis of trimethylaluminum and a higher trialkylaluminum such as tri-iso-butylaluminum. MMAO's are generally more soluble in aliphatic solvents and more stable during storage. There are a variety of methods for preparing alumoxane and modified alumoxanes, non-limiting examples of which are described in U.S. Pat. Nos. 4,665,208, 4,952,540, 5,091,352, 5,206,199, 5,204,419, 4,874,734, 4,924,018, 4,908,463, 4,968,827, 5,308,815, 5,329,032, 5,248,801, 5,235,081, 5,157,137, 5,103,031, 5,391,793, 5,391,529, 5,693,838, 5,731,253, 5,731,451, 5,744,656, 5,847,177, 5,854,166, 5,856,256 and 5,939,346 and European Publications EP-A-0 561 476, EP-B-0 279 586, EP-A-0 594 218 and EP-B1-0 586 665, and PCT Publication Nos. WO 94/10180 and WO 99/15534, all of which are herein fully incorporated by reference. It may be preferable to use a visually clear methylalumoxane. A cloudy or gelled alumoxane can be filtered to produce a clear solution or clear alumoxane can be decanted from the cloudy solution. Another alumoxane is a modified methyl alumoxane (MMAO) cocatalyst type 3A (commercially available from Akzo Chemicals, Inc. under the trade name Modified Methylalumoxane type 3A, and disclosed in U.S. Pat. No. 5,041,584).

In addition or in place of alumoxanes, the transition metal compounds described herein can be activated ionizing or stoichiometric activator, neutral or ionic, such as tri(n-butyl) ammonium tetrakis(pentafluorophenyl)boron, a trisperfluorophenyl boron metalloid precursor or a trisperfluoronapthyl boron metalloid precursor, polyhalogenated heteroborane anions (WO 98/43983), boric acid (U.S. Pat. No. 5,942,459) or combination thereof.

Examples of neutral stoichiometric activators include trisubstituted boron, tellurium, aluminum, gallium and indium or mixtures thereof. The three substituent groups are each independently selected from alkyls, alkenyls, halogen, substituted alkyls, aryls, arylhalides, alkoxy and halides. Preferably, the three groups are independently selected from halogen, mono or multicyclic (including halosubstituted) aryls, alkyls, and alkenyl compounds and mixtures thereof, preferred are alkenyl groups having 1 to 20 carbon atoms, alkyl groups having 1 to 20 carbon atoms, alkoxy groups having 1 to 20 carbon atoms and aryl groups having 3 to 20 carbon atoms (including substituted aryls). More preferably, the three groups are alkyls having 1 to 4 carbon groups, phenyl, napthyl or mixtures thereof. Even more preferably, the three groups are halogenated, preferably fluorinated, aryl groups. Most preferably, the neutral stoichiometric activator is trisperfluorophenyl boron or trisperfluoronapthyl boron.

Examples of neutral stoichiometric activators include tri-substituted boron, tellurium, aluminum, gallium and indium or mixtures thereof. The three substituent groups are each independently selected from alkyls, alkenyls, halogen, substituted alkyls, aryls, arylhalides, alkoxy and halides. Preferably, the three groups are independently selected from halogen, mono or multicyclic (including halosubstituted) aryls, alkyls, and alkenyl compounds and mixtures thereof, preferred are alkenyl groups having 1 to 20 carbon atoms, alkyl groups having 1 to 20 carbon atoms, alkoxy groups having 1 to 20 carbon atoms and aryl groups having 3 to 20 carbon atoms (including substituted aryls). More preferably, the three groups are alkyls having 1 to 4 carbon groups, phenyl, napthyl or mixtures thereof. Even more preferably, the three groups are halogenated, preferably fluorinated, aryl groups. Most preferably, the neutral stoichiometric activator is trisperfluorophenyl boron or trisperfluoronapthyl boron.

Ionic stoichiometric activator compounds may contain an active proton, or some other cation associated with, but not coordinated to, or only loosely coordinated to, the remaining ion of the ionizing compound. Such compounds and the like are described in European publications EP-A-0 570 982, EP-A-0 520 732, EP-A-0 495 375, EP-B1-0 500 944, EP-A-0 277 003 and EP-A-0 277 004, and U.S. Pat. Nos. 5,153,157, 5,198,401, 5,066,741, 5,206,197, 5,241,025, 5,384,299 and 5,502,124, all of which are herein fully incorporated by reference. Ionic catalysts can be preparedly reacting a transition metal compound with a neutral Lewis acid, such as $B(C_6F_6)_3$, which upon reaction with the hydrolyzable ligand (X) of the transition metal compound forms an anion, such as ($[B(C_6F_5)_3(X)]^-$), which stabilizes the cationic transition metal species generated by the reaction.

Compounds useful as an activator component in the preparation of the ionic catalyst systems used in the process of this invention comprise a cation, which is preferably a Bronsted acid capable of donating a proton, and a compatible non-coordinating anion which anion is relatively large (bulky), capable of stabilizing the active catalyst species (the Group 4 cation) which is formed when the two compounds are combined and said anion will be sufficiently labile to be displaced by olefinic diolefinic and acetylenically unsaturated substrates or other neutral Lewis bases such as ethers, nitrites and the like. Two classes of compatible non-coordinating anions have been disclosed in EPA 277,003 and EPA 277,004 published 1988: 1) anionic coordination complexes comprising a plurality of lipophilic radicals covalently coordinated to and shielding a central charge-bearing metal or metalloid core, and 2) anions comprising a plurality of boron atoms such as carboranes, metallacarboranes and boranes.

In a preferred embodiment, the stoichiometric activators include a cation and an anion component, and may be represented by the following formula:

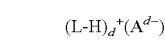

wherein
L is an neutral Lewis base;
H is hydrogen;
(L-H)$^+$ is a Bronsted acid;
$A^{d-}$ is a non-coordinating anion having the charge d−; and
d is an integer from 1 to 3.

The cation component, $(L-H)_d^+$ may include Bronsted acids such as protons or protonated Lewis bases or reducible Lewis acids capable of protonating or abstracting a moiety, such as an alkyl or aryl, from the bulky ligand metallocene containing transition metal catalyst precursor, resulting in a cationic transition metal species.

The anion component $A^{d-}$ include those having the formula $[M^{k+}Q_n]^{d-}$ wherein k is an integer from 1 to 3; n is an integer from 2-6; n−k=d; M is an element selected from Group 13 of the Periodic Table of the Elements, preferably boron or aluminum, and Q is independently a hydride, bridged or unbridged dialkylamido, halide, alkoxide, aryloxide, hydrocarbyl, substituted hydrocarbyl, halocarbyl, substituted halocarbyl, and halosubstituted-hydrocarbyl radicals, said Q having up to 20 carbon atoms with the proviso that in not more than 1 occurrence is Q a halide. Preferably, each Q is a fluorinated hydrocarbyl group having 1 to 20 carbon atoms, more preferably each Q is a fluorinated aryl group, and most preferably each Q is a pentafluoryl aryl group. Examples of suitable $A^{d-}$ also include diboron compounds as disclosed in U.S. Pat. No. 5,447,895, which is fully incorporated herein by reference.

Illustrative, but not limiting examples of the ionic stoichiometric activator $(L-H)_d^+(A^{d-})$ is N,N-dimethylanilinium tetra (perfluorophenyl)borate, N,N-dimethylanilinium tetrakis (perfluoronapthyl)borate, N,N-dimethylanilinium tetrakis (perfluorobiphenyl)borate, N,N-dimethylanilinium tetrakis (3,5-bis(trifluoromethyl)phenyl)borate, triphenylcarbenium tetrakis(perfluoronapthyl)borate, triphenylcarbenium tetrakis(perfluorobiphenyl)borate, triphenylcarbenium tetrakis(3,5-bis(trifluoromethyl)phenyl)borate, or triphenylcarbenium tetra(perfluorophenyl)borate.

In one embodiment, an activation method using ionizing ionic compounds not containing an active proton but capable of producing a bulky ligand metallocene catalyst cation and their non-coordinating anion are also contemplated, and are described in EP-A-0 426 637, EP-A-0 573 403 and U.S. Pat. No. 5,387,568, which are all herein incorporated by reference. The term "non-coordinating anion" (NCA) means an anion which either does not coordinate to said cation or which is only weakly coordinated to said cation thereby remaining sufficiently labile to be displaced by a neutral Lewis base. "Compatible" non-coordinating anions are those which are not degraded to neutrality when the initially formed complex decomposes. Further, the anion will not transfer an anionic substituent or fragment to the cation so as to cause it to form a neutral four coordinate metallocene compound and a neutral by-product from the anion. Non-coordinating anions useful in accordance with this invention are those that are compatible, stabilize the metallocene cation in the sense of balancing its ionic charge at +1, yet retain sufficient lability to permit displacement by an ethylenically or acetylenically unsaturated monomer during polymerization. These types of cocatalysts sometimes use tri-isobutyl aluminum or tri-octyl aluminum as a scavenger.

The polymerization process also can employ cocatalyst compounds or activator compounds that are initially neutral Lewis acids but form a cationic metal complex and a noncoordinating anion, or a zwitterionic complex upon reaction with the invention compounds. For example, tris(pentafluorophenyl)boron or aluminum act to abstract a hydrocarbyl or hydride ligand to yield an invention cationic metal complex and stabilizing noncoordinating anion, see EP-A-0 427 697 and EP-A-0 520 732 for illustrations of analogous Group-4 metallocene compounds. Also, see the methods and compounds of EP-A-0 495 375. For formation of zwitterionic complexes using analogous Group 4 compounds, see U.S. Pat. Nos. 5,624,878; 5,486,632; and 5,527,929.

When two transition metal compound based catalysts are used in one reactor as a mixed catalyst system, the two transition metal compounds should be chosen such that the two are compatible. A simple screening method such as by $^1$H or $^{13}$C NMR, known to those of ordinary skill in the art, can be used to determine which transition metal compounds are compatible.

It is preferable to use the same activator for the transition metal compounds, however, two different activators, such as a non-coordinating anion activator and an alumoxane, can be used in combination. If one or more transition metal compounds contain an $X_1$ or $X_2$ ligand which is not a hydride, hydrocarbyl, or substituted hydrocarbyl, then the alumoxane should be contacted with the transition metal compounds prior to addition of the non-coordinating anion activator.

The catalyst systems used to produce the present copolymer may also include a support material or carrier. For example, the one or more catalyst components and/or one or more activators may be deposited on, contacted with, vaporized with, bonded to, or incorporated within, adsorbed or absorbed in, or on, one or more supports or carriers. The support material may any of the conventional support materials. Preferably the support material is a porous support material, for example, talc, inorganic oxides and inorganic chlorides. Other support materials include resinous support materials such as polystyrene, functionalized or crosslinked organic supports, such as polystyrene divinyl benzene polyolefins or polymeric compounds, zeolites, clays, or any other organic or inorganic support material and the like, or mixtures thereof.

The preferred support materials are inorganic oxides that include those Group 2, 3, 4, 5, 13 or 14 metal oxides. The preferred supports include silica, which may or may not be dehydrated, fumed silica, alumina (WO 99/60033), silica-alumina and mixtures thereof. Other useful supports include magnesia, titania, zirconia, magnesium chloride (U.S. Pat. No. 5,965,477), montmorillonite (European Patent EP-B1 0 511 665), phyllosilicate, zeolites, talc, clays (U.S. Pat. No. 6,034,187) and the like. Also, combinations of these support materials may be used, for example, silica-chromium, silica-alumina, silica-titania and the like. Additional support materials may include those porous acrylic polymers described in EP 0 767 184 B1, which is incorporated herein by reference. Other support materials include nanocomposites as described in PCT WO 99/47598, aerogels as described in WO 99/48605, spherulites as described in U.S. Pat. No. 5,972,510 and polymeric beads as described in WO 99/50311, which are all herein incorporated by reference.

It is preferred that the support material, most preferably an inorganic oxide, has a surface area in the range of from about 10 to about 700 m$^2$/g, pore volume in the range of from about 0.1 to about 4.0 cc/g and average particle size in the range of from about 5 to about 500 μm. More preferably, the surface area of the support material is in the range of from about 50 to about 500 m$^2$/g, pore volume of from about 0.5 to about 3.5 cc/g and average particle size of from about 10 to about 200 μm. Most preferably the surface area of the support material is in the range is from about 100 to about 400 m$^2$/g, pore volume from about 0.8 to about 3.0 cc/g and average particle size is from about 5 to about 100 μm. The average pore size of the carrier useful in the invention typically has pore size in the range of from 10 to 1000 Å, preferably 50 to about 500 Å, and most preferably 75 to about 350 Å.

As is well known in the art, the catalysts may also be supported together on one inert support, or the catalysts may be independently placed on two inert supports and subsequently mixed. Of the two methods, the former is preferred.

Each of the two polymerization stages employed to produce the present copolymers can be conducted as a solution, bulk, gas or slurry polymerization process or a combination thereof, preferably solution phase or bulk phase polymerization process.

Homogeneous solution polymerization generally involves polymerization in a continuous reactor in which the polymer formed and the starting monomer and catalyst materials supplied, are agitated to reduce or avoid concentration gradients. Suitable processes operate above the cloud point of the polymers at high pressures, from 1 to 3000 bar (0.1-300 MPa), in which the monomer acts as diluent or in solution polymerization using a solvent.

Temperature control in the reactor is obtained by balancing the heat of polymerization with reactor cooling by reactor jackets or external heat exchangers or internal cooling coils to cool the contents of the reactor, auto refrigeration, pre-chilled feeds, vaporization of liquid medium (diluent, monomers or solvent) or combinations of all three. Adiabatic reactors with pre-chilled feeds may also be used. The reactor temperature depends on the catalyst used. In general, the reactor temperature preferably can vary between about 30° C. and about 200° C., more preferably from about 90° C. to about 150° C., and most preferably from about 100° C. to about 140° C. In series operation, the second reactor temperature is preferably higher than the first reactor temperature. The pressure can vary from about 1 mm Hg to 2500 bar (250 MPa), preferably from 0.1 bar to 1600 bar (0.01-160 MPa), most preferably from 1.0 to 500 bar (0.1-50 MPa).

In one embodiment 500 ppm or less of hydrogen is added to the polymerization, or 400 ppm or less or 300 ppm or less. In other embodiments at least 50 ppm of hydrogen is added to the polymerization, or 100 ppm or more, or 150 ppm or more.

Each of the polymerization steps may be conducted in a single reactor, parallel or series reactor configurations. The liquid processes comprise contacting olefin monomers with the above described catalyst systems in a suitable diluent or solvent and allowing said monomers to react for a sufficient time to produce the desired polymers. Hydrocarbon solvents are suitable, both aliphatic and aromatic. Alkanes, such as hexane(s), pentane, isopentane, cyclohexane, and octane, are preferred.

The process can be carried out in continuous stirred tank reactors, batch reactors or plug flow reactors. These reactors may have or may not have internal cooling or heating and the monomer feed may or may not be refrigerated. See the general disclosure of U.S. Pat. No. 5,001,205 for general process conditions. See also, International Patent Publication Nos. WO 96/33227 and WO 97/22639.

Formulation of Adhesives

The copolymer produced herein can be used directly as an adhesive or can be blended with other components to form an adhesive.

For example, tackifiers may be used with the present copolymer. Examples of suitable tackifiers, include, but are not limited to, aliphatic hydrocarbon resins, aromatic modified aliphatic hydrocarbon resins, hydrogenated polycyclopentadiene resins, polycyclopentadiene resins, gum rosins, gum rosin esters, wood rosins, wood rosin esters, tall oil rosins, tall oil rosin esters, polyterpenes, aromatic modified polyterpenes, terpene phenolics, aromatic modified hydrogenated polycyclopentadiene resins, hydrogenated aliphatic resin, hydrogenated aliphatic aromatic resins, hydrogenated terpenes and modified terpenes, hydrogenated rosin acids, and hydrogenated rosin esters. In some embodiments the tackifier is hydrogenated.

In other embodiments the tackifier is non-polar, by which is meant that the tackifier is substantially free of monomers having polar groups. Preferably the polar groups are not present, however if present, they comprise not more that 5 weight %, preferably not more that 2 weight %, even more preferably no more than 0.5 weight %, of the tackifier. In some embodiments the tackifier has a softening point (Ring and Ball, as measured by ASTM E-28) of 80° C. to 150° C., preferably 100° C. to 130° C. In another embodiment the resin is liquid and has a R and B softening point of between 10 and 70° C.

The tackifier, if present, is typically present at about 1 to about 80 weight %, more preferably 2 to 40 weight %, even more preferably 3 to 30 weight %, based upon the weight of the blend.

Preferred hydrocarbon resins for use as tackifiers or modifiers include:

(a) Resins such as C5/C6 terpene resins, styrene terpenes, alpha-methyl styrene terpene resins, C9 terpene resins, aromatic modified C5/C6, aromatic modified cyclic resins, aromatic modified dicyclopentadiene based resins or mixtures thereof. Additional preferred resins include those described in WO 91/07472, U.S. Pat. Nos. 5,571,867, 5,171,793 and 4,078,132. Typically these resins are obtained from the cationic polymerization of compositions containing one or more of the following monomers: C5 diolefins (such as 1-3 pentadiene, isoprene, etc); C5 olefins (such as 2-methylbutenes, cyclopentene, etc.); C6 olefins (such as hexene), C9 vinylaromatics (such as styrene, alpha methyl styrene, vinyltoluene, indene, methyl indene, etc.); cyclics (such as dicyclopentadiene, methyldicyclopentadiene, etc.); and or terpenes (such as limonene, carene, etc).

(b) Resins obtained by the thermal polymerization of dicyclopentadiene, and/or the thermal polymerization of dimers or oligomers of cyclopentadiene and/or methylcyclopentadiene, optionally with vinylaromatics (such as styrene, alpha-methyl styrene, vinyl toluene, indene, methyl indene).

The adhesive composition can also include one or more waxes, such as polar waxes, non-polar waxes, Fischer-Tropsch waxes, oxidized Fischer-Tropsch waxes, hydroxystearamide waxes, functionalized waxes, polypropylene waxes, polyethylene waxes, wax modifiers, and combinations thereof, for example. The adhesive composition may include 30 percent by weight or less of the one or more waxes. More preferably, the adhesive composition includes 10 percent by weight or less of the one or more waxes.

In some embodiments, however, wax may not be desired and is present at less than 5 weight %, preferably less than 3 weight %, more preferably less than 1 weight %, more preferably less than 0.5 weight %, based upon the weight of the composition.

In yet another aspect, the adhesive composition can include 60 percent by weight or less, or 50 percent by weight or less, or 40 percent by weight or less, or 30 percent by weight or less, or 20 percent by weight or less, or 15 percent by weight or less, or 10 percent by weight or less, or 5 percent by weight or less of one or more additives. The one or more additives can include plasticizers, oils, stabilizers, antioxidants, pigments, dyestuffs, antiblock additives, polymeric additives, defoamers, preservatives, thickeners, adhesion promoters, rheology modifiers, humectants, fillers, surfactants, processing aids, cross-linking agents, neutralizing agents, flame retardants, fluorescing agents, compatibilizers, antimicrobial agents, and water, for example.

Exemplary oils may include aliphatic naphthenic oils, white oils, and combinations thereof, for example. The phthalates may include di-iso-undecyl phthalate (DIUP), di-isononylphthalate (DINP), dioctylphthalates (DOP), combinations thereof, or derivatives thereof. Exemplary polymeric additives include homo poly-alpha-olefins, copolymers of alpha-olefins, copolymers and terpolymers of diolefins, elastomers, polyesters, block copolymers including diblocks and triblocks, ester polymers, alkyl acrylate polymers, and acrylate polymers. Exemplary plasticizers may include mineral oils, polybutenes, phthalates, and combinations thereof. Exemplary anti-oxidants include alkylated phenols, hindered phenols, and phenol derivatives, such as t-butyl hydroquinone, butylated hydroxyanisole, polybutylated bisphenol, butylated hydroxy toluene (BHT), alkylated hydroquinone, 2,6-di-tert-butyl-paracresol, 2,5-di-tert-aryl hydroquinone, octadecyl-3-(3,5-di-tert-butyl-4-hydroxy phenyl) etc.

Exemplary fillers include silica, diatomaceous earth, calcium carbonate, iron oxide, hydrogenated castor oil, fumed silica, precipitated calcium carbonate, hydrophobic treated fumed silicas, hydrophobic precipitated calcium carbonates, talc, zinc oxides, polyvinyl chloride powders, fungicides, graphite, carbon black, asphalt, carbon fillers, clay, mica, fibers, titanium dioxide, cadmium sulfide, asbestos, wood fluor, polyethylene powder, chopped fibers, bubbles, beads, thixotropes, bentonite, calcium sulfate, calcium oxide, magnesium oxide, and combinations or derivates thereof. Exemplary surfactants include vinyl-containing or mercapto-containing polyorganosiloxanes, macromonomers with vinyl terminated polydimethyl siloxane, and combinations or derivatives thereof.

Exemplary adhesion promoters include silanes, titanates, organosylane, acrylics, acids, anhydrides, epoxy resins, hardening agents, polyamides, methylacrylates, epoxies, phenolic resins, polyisobutylene, aminoalkyl, mercaptoalkyl, epoxyalkyl, ureidoalkyl, carboxy, acrylate and isocyanurate functional silanes, mercaptopropyltrimethoxysilane, glycidoxpropyltrimethoxysilane, aminopropyltriethoxysilane, aminoethylaminopropyltrimethoxysilane, ureidopropyltrimethyloxysilane, bis-gamma-trimethoxysilyl-propylurea, 1,3,5-tris-gamma-trimethoxysilylpropylisocyanurate, bis-gamma-trimethoxysilylpropylmaleate, fumarate and gamma-methacryloxypropyltrimethoxysilane, aminopropyltriethoxysilane, and combinations and derivatives thereof. Exemplary crosslinking agents include oxime crosslinkers, alkoxysilanes, epoxyalkylalkoxysilanes, amido silanes, aminosilanes, enoxysilanes, tetraethoxysilanes, methyltrimethoxy silane, vinyl trimethoxysilane, glycidoxypropyltrimethoxsilane, vinyl tris-isopropenoxysilane, methyl tris-isopropenoxysilane, methyl tris-cyclohexylaminosilane, methyl tris-secondarybutylaminosilane, polyisocyanates, and combinations or derivatives thereof. Exemplary organic solvents include aliphatic solvents, cycloaliphatic solvents, mineral spirits, aromatic solvents, hexane, cyclohexane, benzene, toluene, xylene, and combinations or derivatives thereof.

Exemplary stabilizers include hindered phenols, sulfur phenols, phosphorous-containing phenols, 1,3,5-trimethyl-2,4,6-tris(3-5-di-tert-butyl-4-hydroxybenzyl)benzene, pentaerythritol tetrakis-3(3,5-di-tert-butyl-4-hydroxyphenyl) propionate, n-octadecyl-3(3,5-di-tert-butyl-4-hydroxyphenyl)propionate, 4,4'-methylenebis(4-methyl-6-tert butylphenol), 4,4'-thiobis(6-tertbutyl-o-cresol), 2,6-di-tert-butylphenol, 6-(4-hydroxyphenoxy)-2,4-bis(n-octylthio)-1,3,5-triazine, 2,4,6-tris(4-hydroxy-3,5-di-tert-butyl-phenoxy)-1,3,5-triazine, di-n-octadecyl-3,5-di-tert-butyl-4-hydroxybenzylphosphonate, 2-(n-octylthio)ethyl-3, 5-di-tert-butyl-4-hydroxybenzoate, sorbitol hexa-(3,3,5-di-tertbutyl-4-hydroxy-phenyl)propionate, and combinations or derivatives thereof. In one aspect, the adhesive composition includes from 0.1 to 3 percent by weight of the one or more stabilizers.

In another embodiment the copolymer produced by this invention may be blended with one or more additional polymers to produce a blend in which the present copolymer is present in an amount of from 10 to 99 weight %, preferably 20 to 95 weight %, even more preferably at least 30 to 90 weight %, even more preferably at least 40 to 90 weight %, even more preferably at least 50 to 90 weight %, even more preferably at least 60 to 90 weight %, even more preferably at least 70 to 90 weight %, based upon the total weight of the polymers in the blend. Such blends may be produced by mixing the two or more polymers together, by connecting reactors together in series to make reactor blends or by using more than one catalyst in the same reactor to produce multiple species of polymer. The polymers can be mixed together prior to being put into the extruder or may be mixed in an extruder.

Suitable polymers for producing blends with the present copolymer include elastomers (preferred elastomers include all natural and synthetic rubbers, including those defined in ASTM D1566). In a preferred embodiment elastomers are blended with the polymer produced by this invention to form rubber toughened compositions. In a particularly preferred embodiment the rubber toughened composition is a two (or more) phase system where the rubber is a discontinuous phase and the polymer is a continuous phase. Examples of preferred elastomers include one or more of the following: ethylene propylene rubber, ethylene propylene diene monomer rubber, neoprene rubber, styrenic block copolymer rubbers (including SI, SIS, SB, SBS, SIBS, SEBS, SEPS, and the like (S is styrene, I is isoprene, B is butadiene, EB is ethylenebutylene, EP is ethylenepropylene), butyl rubber, halobutyl rubber, copolymers of isobutylene and para-alkylstyrene, halogenated copolymers of isobutylene and para-alkylstyrene. This blend may be combined with the tackifiers and/or other additives as described above.

In another embodiment the present copolymer may be blended with impact copolymers. Impact copolymers are defined to be a blend of isotactic PP and an elastomer such as an ethylene-propylene rubber. In a preferred embodiment the blend is a two (or more) phase system where the impact copolymer is a discontinuous phase and the present copolymer is a continuous phase.

In another embodiment the present copolymer may be blended with ester polymers. In a preferred embodiment the blend is a two (or more) phase system where the polyester is a discontinuous phase and the present copolymer is a continuous phase.

In a preferred embodiment present copolymer is combined with metallocene polyethylenes (mPE's) or metallocene polypropylenes (mPP's). The mPE and mPP homopolymers or copolymers are typically produced using mono- or bis-cyclopentadienyl transition metal catalysts in combination with an activator of alumoxane and/or a non-coordinating anion in solution, slurry, high pressure or gas phase. The catalyst and activator may be supported or unsupported and the cyclopentadienyl rings may be substituted or unsubstituted. Several commercial products produced with such catalyst/activator combinations are commercially available from ExxonMobil Chemical Company in Baytown, Tex. under the trade names EXCEED™, ACHIEVE™ and EXACT™. For more information on the methods and catalysts/activators to produce such mPE homopolymers and copolymers see WO 94/26816; WO 94/03506; EPA 277,003; EPA 277,004; U.S.

Pat. Nos. 5,153,157; 5,198,401; 5,240,894; 5,017,714; CA 1,268,753; U.S. Pat. No. 5,324,800; EPA 129,368; U.S. Pat. No. 5,264,405; EPA 520,732; WO 92 00333; U.S. Pat. No. 5,096,867; 5,507,475; EPA 426 637; EPA 573 403; EPA 520 732; EPA 495 375; EPA 500 944; EPA 570 982; WO91/ 09882; WO94/03506 and U.S. Pat. No. 5,055,438.

Any of the above polymers, including the present copolymer, may be functionalized. By functionalized is meant that the polymer has been contacted with an unsaturated acid or anhydride. Preferred unsaturated acids or anhydrides include any unsaturated organic compound containing at least one double bond and at least one carbonyl group. Representative acids include carboxylic acids, anhydrides, esters and their salts, both metallic and non-metallic. Preferably the organic compound contains an ethylenic unsaturation conjugated with a carbonyl group (—C═O). Examples include maleic, fumaric, acrylic, methacrylic, itaconic, crotonic, alpha methyl crotonic, and cinnamic acids as well as their anhydrides, esters and salt derivatives. Particularly preferred functional groups include maleic acid and maleic anhydride. Maleic anhydride is particularly preferred. The unsaturated acid or anhydride is preferably present at about 0.1 weight % to about 10 weight %, preferably at about 0.5 weight % to about 7 weight %, even more preferably at about 1 to about 4 weight %, based upon the weight of the hydrocarbon resin and the unsaturated acid or anhydride.

In one embodiment, an adhesive composition comprising a multi-component copolymer produced by the present process has the following properties:
  (a) at least 50% fiber tear at −18° C. used Inland paper board as a substrate;
  (b) at least 50% fiber tear at 20° C. used Inland paper board as a substrate;
  (c) a viscosity of less than 1,200 mPa sec at 190° C.;
  (d) a set time of less than 3 seconds; and
  (f) a toughness of 3.4 megajoule/m$^3$ or more.

In yet another embodiment, an adhesive composition comprising a multi-component copolymer produced by the present process has the following properties:
  (a) a viscosity of less than 25,000 mPa sec at 190° C.;
  (b) a Dot T-Peel adhesion of 10 Newton or more for adhesion between a fiber board and a fabric substrate;
  (c) a set time of 10 seconds or less;
  (d) an open time of 3 seconds or longer;
  (g) a toughness of 7 megajoule/m$^3$ or more, preferably 14 megajoule/m$^3$ or more; and
  (h) an elongation of 400% or more.

In yet a further embodiment, an adhesive composition comprising a multi-component copolymer produced by the present process has the following properties:
  (a) a viscosity of 25,000 mPa sec. or less sec at 190° C.;
  (b) a Dot T-Peel adhesion of 10 Newton or more for adhesion between two PET films at room temperature;
  (c) a Dot T-Peel adhesion of 10 Newton or more for adhesion between two PET films at 40° C.;
  (d) a toughness of 7 megajoule/m$^3$ or more, preferably 14 megajoule/m$^3$ or more; and
  (f) an elongation of 400% or more.

In order to measure set time, Dot T-Peel and substrate fiber tear, adhesive test specimens were created by bonding the substrates together with a dot of about 0.3 grams of molten adhesive and compressing the bond with a 500-gram weight. The dot size was controlled by the adhesive volume such that in most cases the compressed disk which formed gave a uniform circle just inside the dimensions of the substrates.

Once a construct has been produced it can be subjected to various insults in order to assess the effectiveness of the bond. Once a bond to a substrate fails a simple way to quantify the effectiveness of the adhesive is to estimate the area of the adhesive dot that retained substrate fibers as the construct failed along the bond line. This estimate is called percent substrate fiber tear. An example of good adhesion, after conditioning a sample for 15 hours at −12° C. and attempting to destroy the bond, would be an estimate of 80-100% substrate fiber tear. It is likely that 0% substrate fiber tear under those conditions would signal a loss of adhesion.

Substrate fiber tear: The specimens were prepared using the same procedure as that described above. For low temperature fiber tear test, the bond specimens were placed in a freezer or refrigerator to obtain the desired test temperature. For substrate fiber tear at room temperature, the specimens were aged at ambient conditions. The bonds were separated by hand and a determination made as to the type of failure observed. The amount of substrate fiber tear is expressed herein as a percentage. All the fiber tear tests were conducted using inland paper board as the substrate.

Set time is defined as the time it takes for a compressed adhesive substrate construct to fasten together enough to give substrate fiber tear when pulled apart, and thus the bond is sufficiently strong to remove the compression. The bond will likely still strengthen upon further cooling, however, it no longer requires compression. These set times were measured by placing a molten dot of adhesive on to a file folder substrate taped to a flat table. A file folder tab (1 inch by 3 inch (2.5 cm×7.6 cm) was placed upon the dot 3 seconds later and compressed with a 500 gram weight. The weight was allowed to sit for about 0.5 to about 10 seconds. The construct thus formed was pulled apart to check for a bonding level good enough to produce substrate fiber tear. The set time was recorded as the minimum time required for this good bonding to occur. Standards were used to calibrate the process.

Dot T-Peel was determined according to ASTM D 1876, except that the specimen was produced by combining two 1 inch by 3 inch (2.54 cm×7.62 cm) substrate cut outs with a dot of adhesive with a volume that, when compressed under a 500 gram weight occupied about 1 square inch of area (1 inch=2.54 cm). Once made all the specimens were pulled apart in side-by-side testing (at a rate of 2 inches per minute) by a machine (such as an Instron) that records the destructive force of the insult being applied. The maximum force achieved for each sample tested was recorded and averaged, thus producing the Average Maximum Force, which is reported as the Dot T-Peel.

Peel Strength (modified ASTM D1876): Substrates (1×3 inches (25×76 mm)) were heat sealed with adhesive film (5 mils (130 μm) thickness) at 135° C. for 1 to 2 seconds and 40 psi (0.28 MPa) pressure. Bond specimens were peeled back in a tensile tester at a constant crosshead speed of 2 in/min (51 mm/min). The average force required to peel the bond (5 specimens) apart was recorded.

Open time is determined according to ASTM D4497.

Shore A hardness was measured according to ASTM 2240. An air cooled dot of adhesive was subjected to the needle and the deflection was recorded from the scale.

Adhesive melt viscosity and viscosity profiles vs. temperature were measured using a Brookfield digital viscometer and a number 27 spindle according to ASTM D-3236.

SAFT (modified ASTM D 4498-00) measures the ability of a bond to withstand an elevated temperature rising at 10° F. (5.5° C.)/15 min., under a constant force that pulls the bond in the shear mode. Bonds were formed in the manner described above on Kraft paper (1 inch by 3 inch (2.5 cm×7.6 cm)). The test specimens were suspended vertically in an oven at room temperature with a 500-gram load attached to the bottom. The temperatures at which the weight fell were recorded (when the occasional sample reached temperatures above the oven capacity >265° F. (129° C.) it was terminated and averaged in with the other samples at termination temperature).

Peel Adhesion Failure Temperature (PAFT) was determined using following procedure modified according to the procedure of TAPPI T814 PM-77. Two sheets of 6"×12" Kraft paper were laminated together with a one inch strip of molten adhesive heated to 177° C. The laminated sheet was trimmed and cut into 1-inch wide strips. These strips were placed in an oven with a 100-gram of weight hanging in a peel mode. The over temperature increased at a rate of 30° C. per hour. The samples were hung from a switch that trips when the samples fail to record the temperature of failure.

Cloud point is determined by heating the adhesive blends to about 180° C. and it is stirred until homogenized. Then a thermometer is inserted into the composition and time is allowed for the temperature to stabilize. The temperature at which the molten adhesive clouds over is then noted. These measures of cloud point provide an indication of a hot melt's overall compatibility, i.e., the compatibility of the individual ingredients with each other.

Plaques suitable for physical property testing were compression molded on a Carver hydraulic press. 6.5 g of polymer was molded between brass plates (0.05" thick) lined with Teflon coated aluminum foil. A 0.033" thick chase with a square opening 4"×4" was used to control sample thickness. After one minute of preheat at 170° C., under minimal pressure, the hydraulic load was gradually increased to ~10,000-15,000 lbs., at which it was held for three minutes. Subsequently the sample and molding plates were cooled for three minutes under ~10,000 to 15,000 lbs. load between the water cooled platens of the press. Plaques were allowed to equilibrate at room temperature for a minimum of two days prior to physical property testing.

Dog bones for tensile testing were cut from compression molded plaques using a mallet handle die. Specimen dimensions were those specified in ASTM D 638. Tensile properties were measured on an Instron™ model 4502 equipped with a 22.48 lb. load cell and pneumatic jaws fitted with serrated grip faces. Deformation was performed at a constant crosshead speed of 5.0 in/min with a data sampling rate of 25 points/second. Jaw separation prior to testing was 0.876", from which strains were calculated assuming affine deformation. Initial modulus, stress and strain at yield (where evident), peak stress, tensile strength at break, and strain at break were calculated. A minimum of five specimens from each plaque was tested, the results being reported as the average value. All stresses quoted were calculated based upon the original cross-sectional area of the specimen, taking no account of reduced cross-section as a function of increasing strain. Tensile strength is defined as the maximum tensile stress. Toughness is defined as the ability of polymer to absorb applied energy. The area under the stress-strain curve is used as a measure of the toughness.

The color of polymers and their blends was measured using Gardner index (Gardner color scale) according to ASTM D 1544-04. Gardner Delta 212 color comparator was used. The samples were melted at a set temperature and aged for a specified period of time prior to measurement.

End-Uses

The adhesives of this invention can be used in any adhesive application, including but not limited to, disposables, packaging, laminates, pressure sensitive adhesives, tapes, labels, wood binding, paper binding, non-wovens, road marking, reflective coatings, and the like.

The adhesives described above may be applied to any substrate. Preferred substrates include wood, paper, cardboard, plastic, thermoplastic, rubber, metal, metal foil (such as aluminum foil and tin foil), metallized surfaces, cloth, non-wovens (particularly polypropylene spun bonded fibers or non-wovens), spunbonded fibers, cardboard, stone, plaster, glass (including silicon oxide (SiOx) coatings applied by evaporating silicon oxide onto a film surface), foam, rock, ceramics, films, polymer foams (such as polyurethane foam), substrates coated with inks, dyes, pigments, PVDC and the like or combinations thereof.

Additional preferred substrates include polyethylene, polypropylene, polyacrylates, acrylics, polyethylene terephthalate, or any of the polymers listed above as suitable for blends. Any of the above substrates, and/or the polymers of this invention, may be corona discharge treated, flame treated, electron beam irradiated, gamma irradiated, microwaved, or silanized.

In a particular embodiment, the adhesives of this invention can be used in a packaging article. The packaging article may be useful as a carton, container, crate, case, corrugated case, or tray, for example. More particularly, the packaging article may be useful as a cereal product, cracker product, beer packaging, frozen food product, paper bag, drinking cup, milk carton, juice carton, drinking cup, or as a container for shipping produce, just to name a few exemplary uses.

The packaging article is formed by applying an adhesive composition to at least a portion of one or more packaging elements. The packaging elements may be formed from paper, paperboard, containerboard, tagboard, corrugated board, chipboard, kraft, cardboard, fiberboard, plastic resin, metal, metal alloys, foil, film, plastic film, laminates, sheeting, or any combination thereof. In one aspect, the adhesive composition may be used to bind or bond two or more packaging elements together wherein the packaging elements are formed from the same or different type of materials. Accordingly, the packaging elements may be individually formed from paper, paperboard, containerboard, tagboard, corrugated board, chipboard, kraft, cardboard, fiberboard, plastic resin, metal, metal alloys, foil, film, plastic film, laminates, sheeting, or any combination thereof. The one or more packaging elements may also be individually coated using paper, foil, metal, metal alloys, polyethylene, polypropylene, polyester, polyethylene terephthalate, polyvinyl chloride, polyvinylidine chloride, polyvinyl acetate, polyamides, homopolymers thereof, and combinations and copolymers thereof.

The in-reactor produced multi-component propylene copolymer for packaging adhesive application has a viscosity of less than 1500 mPa·sec at 190° C. as measured using Brookfield digital viscometer; has a toughness of at least 3.4 megajoule/m$^3$, preferably at least 7 megajoule/m$^3$, more preferably at least 10 megajoule/m$^3$.

The adhesive composition is also formulated to have a viscosity of less than 1000 mPa·sec at 190° C. as measured using Brookfield digital viscometer; has toughness of at least 2 megajoule/m$^3$, preferably at least 5 megajoule/m$^3$, more preferably at least 7 megajoule/m$^3$.

The adhesive composition is also formulated to have fiber tear of greater than 80% at room temperature, and have fiber tear of greater than 80% at −18° C. All of the fiber tear should be tested on inland paper board. The adhesive composition is also formulated to have a set time of less than 4 seconds, preferably less than 3 seconds, more preferably less than 2 seconds.

The formulated adhesive composition is also have and a PAFT of at least 60° C., preferably at least of 80° C. The adhesive composition also have a SAFT of at least 70° C., preferably at least of 100° C. The cloud point of the adhesive composition is 170° C. or less, preferably 130° C. or less.

One typical formulation of the adhesive composition comprises at least 80 percent by weight of the present multi-component copolymer, up to 10 percent by weight of one or more tackifiers, up to 10 percent by weight of one or more waxes, up to 10 percent by weight of one or more functionalized polyolefins, and up to 15 percent by weight of one or more other additives. Another typical formulation of the adhesive composition comprises at least 85 percent by weight of the present copolymer, up to 5 percent by weight of one or more functionalized polyolefins, up to 5 percent by weight of one or more waxes, and up to 15 percent by weight of one or more other additives. Yet another typical formulation of the adhesive composition comprises at least 90 percent by weight of the present copolymer, up to 5 percent by weight of one or more functionalized polyolefins, up to 5 percent by weight of one or more waxes, and up to 10 percent by weight of one or more other additives.

In a particular embodiment, the adhesives of this invention can be used in disposable articles. As used herein, "disposable articles" refer to articles that are not meant for extended use. A typical life span of a disposable article can be a single use for any given period of time to multiple uses that last from seconds to days, to even weeks or longer periods of use. Typically, disposable articles are formed by attaching a first disposable element to at least a portion of a second disposable element using an adhesive composition. Disposable elements may be formed from nonwoven fabrics, nonwoven webs, non-elastic nonwoven fabrics, elastic nonwoven fabrics, necked-bonded laminates, stretch-bonded laminates, spunbond-meltblown-spunbond laminates, polypropylene spunbonded layers, polyethylene layers, combination polyethylene and polypropylene spunbonded layers, elastic strands, styrene-isoprene-styrene, styrene-butadiene-styrene, styrene-ethylene/propylene-styrene, styrene-co-butadiene-styrene, polyurethane, woven fabrics, polypropylene, polyester, body fluid impermeable backsheets, body fluid impermeable layers, body fluid permeable layers, body fluid permeable covers, absorbents, tissues, elastomeric materials, superabsorbent polymers, polyolefin films, polyester films, polyvinylchloride films, polyvinylidine chloride films, polyvinyl acetate films, elastic attachment tape, frontal tape backing, wood, paper, barrier films, film laminates, nonwoven composites, textile materials, woven materials, durable fabrics, absorbents, elastomeric strands, elastomeric webs, tissues, films, coverstock materials, nonwoven polyethylene, perforated polyethylene, superabsorbent polymers, filaments, porous webs, fibers, loop fastener material, spunbonded nonwovens, liners, elastic side panels, fastening tape, elastic bands, rayon, nylon, cellulosic pulp, cellulosic fluff, superabsorbent batts, or combinations thereof.

Exemplary disposable articles may include diapers, training pants, sanitary napkins, panty liners, incontinent wear, bed pads, surgical gowns, surgical drapes, rodent traps, hook and loop fasteners, garments, medical garments, swimwear, or combinations thereof.

The in-reactor produced multi-component propylene copolymer for disposable adhesive application preferably has a viscosity of less than 25,000 mPa·sec at 190° C. as measured using Brookfield digital viscometer; has toughness of at least 7 megajoule/m$^3$, preferably at least 10 megajoule/m$^3$, more preferably at least 15 megajoule/m$^3$; have an elongation of at least 100%, preferably at least 200%, more preferably at least 300%.

The adhesive composition is also preferably formulated to have a viscosity of less than 10,000 mPa·sec at 190° C. as measured using Brookfield digital viscometer; has toughness of at least 5 megajoule/m$^3$, preferably at least 7 megajoule/m$^3$, more preferably at least 10 megajoule/m$^3$; have an elongation of at least 80%, preferably at least 200%, more preferably at least 300%.

The adhesive composition may be formulated to have a PAFT of 30° C. or more, and preferably a PAFT of from 30° C. to 110° C. The adhesive composition also has a SAFT of 50° C. or more, and preferably up to 200° C.

Furthermore, the adhesive compositions in the disposable article preferably have a peel strength (as measured according to ASTM D 1876) of from 90 to 625 g/cm or from 265 to 625 g/cm or from 15 to 450 g/cm. In another embodiment the peel strength of the adhesive composition is 90 to 1000 g/cm, alternately 200 to 900 g/cm.

In another embodiment, the adhesive composition has a creep resistance of from 70% to 95% at 38° C.

In one embodiment, the disposable article is a diaper having two different types of adhesive compositions. The first adhesive composition can be an elastic attachment type adhesive and the second type of adhesive can be a construction type adhesive, sometimes referred to as a core and chassis adhesive. It is advantageous to utilize one adhesive composition for both the elastic attachment adhesive and the construction adhesive because the use of two adhesives on the same diaper poses problems for the diaper manufacturer, which must ensure that the right adhesive is used in the correct melt tank and is applied to the correct place on the diaper. Accordingly, an adhesive that is capable of performing both types of bonding functions is highly desirable.

Elastic attachment adhesives bond elastic materials to disposable elements. Diapers have elastic bands on the legs and/or the waist of the diaper, and typically include a disposable element such as an elastic band attached to a second disposable element, which is the portion of the diaper forming the leg opening or waist. The adhesive composition may be used to attach the elastic band to the second disposable element, which is usually a fluid-impermeable barrier layer. An elastic attachment adhesive primarily exhibits high creep resistance to ensure that the elastic, when under stress, does not move relative to the surface of the second disposable element or become partially or fully detached. Should the elastic move or become detached, the resulting loss of fit could result in inconvenience, waste, embarrassment, discomfort, and associated health and safety problems.

In particular, elasticized areas can be formed by adhesively bonding non-elastic nonwoven fabrics together with at least one elastic strand disposed in the middle. In such a process, the elasticized area is a laminated structure including a nonwoven substrate, at least one elastic strand and a hot-melt adhesive composition, which binds the nonwoven substrate and the at least one elastic strand to one another. The nonwoven substrate is selected from the group consisting of a necked-bonded laminate, a stretch-bonded laminate, a spunbond-meltblown-spunbond laminate, a polypropylene spunbonded layer, and a polyethylene layer in combination with a polypropylene spunbonded layer, or a combination thereof. The elastic strand is selected from the group comprising styrene-isoprene-styrene, styrene-butadiene-styrene, styrene-ethylene/propylene-styrene, styrene/ethylene-co-butadiene/styrene, polyurethane, and combinations thereof.

Another method of forming the elasticized areas includes adhesively bonding an elastic nonwoven fabric together with a non-elastic nonwoven fabric. In such a process, a hot-melt adhesive composition binds a first nonwoven elastic substrate and a second nonwoven substrate to one another. The first nonwoven elastic substrate may be selected from the group including a necked-bonded laminate, a stretch-bonded laminate, a polypropylene spunbonded layer, a polyethylene layer in combination with a polypropylene spunbonded layer, a styrene-isoprene-styrene strand, a styrene-butadiene-styrene strand, a styrene-ethylene/propylene-styrene strand, a styrene/ethylene-co-butadiene/styrene strand, and a polyurethane strand. The second nonwoven substrate may be selected from the group including a necked-bonded laminate, a stretch-bonded laminate, a spunbond-meltblown-spunbond laminate, a polypropylene spunbonded layer, a polyethylene layer in combination with a polypropylene spunbonded layer, a styrene-isoprene-styrene strand, a styrene-butadiene-styrene strand, a styrene-ethylene/propylene-styrene strand, a styrene/ethylene-co-butadiene/styrene strand, and a polyurethane strand.

Elastic attachment adhesives preferably function at body temperature under high peel stress or high shear stress for long periods of time, so that the adhesives should exhibit high peel strength and high shear strength.

The in-reactor produced multi-component propylene copolymer for elastic attachment adhesive application may have a viscosity of less than 25,000 mPa·sec at 190° C. as measured using Brookfield digital viscometer; has toughness of at least 10 megajoule/m$^3$, preferably at least 15 megajoule/m$^3$, more preferably at least 20 megajoule/m$^3$; have an elongation of at least 200%, preferably at least 400%, more preferably at least 600%.

The adhesive composition may also be formulated to have a viscosity of less than 25,000 mPa·sec at 190° C. as measured using Brookfield digital viscometer; has toughness of at least 10 megajoule/m$^3$, preferably at least 15 megajoule/m$^3$, more preferably at least 20 megajoule/m$^3$; has an elongation of at least 400%, preferably at least 600%, more preferably at least 800%

In a particular embodiment, the adhesives described herein can be used in woodworking processes. A woodworking process involves forming a woodworking article by applying an adhesive composition to at least a portion of a structural element. The structural element can include a variety of materials, which include, but are not limited to wood or plywood, or plastic or veneer. For example, the structural element can also include lumber, wood, fiberboard, plasterboard, gypsum, wallboard, plywood, PVC, melamine, polyester, impregnated paper and drywall. A woodworking process can be used to form indoor furniture, outdoor furniture, trim, molding, doors, sashes, windows, millwork and cabinetry, for example.

The in-reactor produced multi-component propylene copolymer for woodworking adhesive application preferably has a viscosity of less than 25,000 mPa sec at 190° C. as measured using Brookfield digital viscometer; has toughness of at least 7 megajoule/m$^3$, preferably at least 10 megajoule/m$^3$, more preferably at least 15 megajoule/m$^3$; has an elongation of at least 200%, preferably at least 400%, more preferably at least 600%.

The adhesive composition may also be formulated to have a viscosity of less than 25,000 mPa sec at 190° C. as measured using Brookfield digital viscometer; has toughness of at least 7 megajoule/m$^3$, preferably at least 10 megajoule/m$^3$, more preferably at least 15 megajoule/m$^3$; has an elongation of at least 200%, preferably at least 400%, more preferably at least 600%.

In yet another aspect, the adhesive composition has an open time of 3 seconds or more. Preferably, the adhesive composition has an open time of 20 seconds or more. More preferably, the adhesive composition has an open time of 60 seconds or more. In another aspect, the adhesive composition has a set time of 5 minute or less, preferably 3 minutes or less, more preferably 2 minutes or less.

One typical formulation of the adhesive composition includes at least 60 percent by weight of the polymer of the present invention, up to 30 percent by weight of one or more tackifiers, up to 10 percent by weight of one or more waxes, up to 10 percent by weight of functionalized polyolefin, and up to 15 percent by weight of one or more additives. Another typical formulation of the adhesive composition includes at least 80 percent by weight of the polymer of the present invention, up to 10 percent by weight of functionalized polyolefin, up to 20 percent by weight of one or more tackifiers, up to 5 percent by weight of one or more waxes, and up to 15 percent by weight of one or more additives.

The invention will now be more particularly described with reference to the following non-limiting Examples.

In the Examples, the hexene-1 content was determined using C-13 NMR. In preparation of a polymer for C-13 NMR analysis about 0.2-0.3 grams of polymer was dissolved in about 3 ml of deuterated tetrachloroethane in a 10-mm diameter NMR tube at about 120° C., then the sample solution was placed into a NMR spectrometer with the probe temperature set to 120° C. Spectral data was collected for at least four hours using an observed pulse angle of less than 90 degrees, ungated proton decoupling and a delay time long enough to allow adequate quantification of the NMR signals of interest. Interpretation of the data is based in part on peak assignments provided by Kissin and Brandolini (Macromolecules, 24, 2632, (1991)), Folini, et al., (Macromol. Chem. Phys., 201, 401 (2000)) and Resconi, et al., (Chem. Rev., 100, 1253, (2000). Instrument measured integral intensities were used to determine sample composition.

The glass transition temperature (Tg) was measured by ASTM E 1356 using a TA Instruments model 2920 machine.

Molecular weights (number average molecular weight (Mn), weight average molecular weight (Mw), and z-average molecular weight (Mz)) were determined using a Waters 150 Size Exclusion Chromatograph (SEC) equipped with a differential refractive index (DRI) detector, an online low angle light scattering (LALLS) detector and a viscometer (VIS). The details of these detectors as well as their calibrations have been described by, for example, T. Sun, P. Brant, R. R. Chance, and W. W. Graessley, in *Macromolecules*, Volume 34, Number 19, 6812-6820, (2001), incorporated herein by reference. Solvent for the SEC experiment was prepared by adding 6 grams of butylated hydroxy toluene (BHT) as an antioxidant to a 4 liter bottle of 1,2,4 trichlorobenzene (TCB) (Aldrich Reagent grade) and waiting for the BHT to solubilize. The TCB mixture was then filtered through a 0.7 micron glass pre-filter and subsequently through a 0.1 micron Teflon filter. There was an additional online 0.7 micron glass pre-filter/0.22 micron Teflon filter assembly between the high pressure pump and SEC columns. The TCB was then degassed with an online degasser (Phenomenex, Model DG-4000) before entering the SEC. Polymer solutions were prepared by placing dry polymer in a glass container, adding the desired amount of TCB, then heating the mixture at 160° C. with continuous agitation for about 2 hours. All quantities were measured gravimetrically. The TCB densities used to express the polymer concentration in mass/volume units were 1.463 g/ml at room temperature and 1.324 g/ml at 135° C. The injection concentration ranged from 1.0 to 2.0 mg/ml, with lower concentrations being used for higher molecular weight samples.

The branching index in the Examples was measured using SEC with an on-line viscometer (SEC-VIS) and is reported as g' at each molecular weight in the SEC trace. The branching index g' is defined as:

$$g' = \frac{\eta_b}{\eta_l}$$

where $\eta_b$ is the intrinsic viscosity of the branched polymer and $\eta_l$ is the intrinsic viscosity of a linear polymer of the same viscosity-averaged molecular weight ($M_v$) as the branched polymer. $\eta_l = K M_v^\alpha$, K and α were measured values for linear polymers and should be obtained on the same SEC-DR1-LS-VIS instrument as the one used for branching index measurement. For polypropylene samples presented in this invention, K=0.0002288 and α=0.705 were used. The SEC-DRI-LS-VIS method obviates the need to correct for polydispersities, since the intrinsic viscosity and the molecular weight were measured at individual elution volumes, which arguably contain narrowly dispersed polymer. Linear polymers selected as standards for comparison should be of the same viscosity average molecular weight, monomer content and composition distribution. Linear character for polymer containing C2 to C10 monomers is confirmed by Carbon-13 NMR using the method of Randall (Rev. Macromol. Chem. Phys., C29 (2&3), p. 285-297). Linear character for C11 and above monomers is confirmed by GPC analysis using a MALLS detector. For example, for a copolymer of propylene, the NMR should not indicate branching greater than that of the co-monomer (i.e. if the comonomer is butene, branches of greater than two carbons should not be present). For a homopolymer of propylene, the GPC should not show branches of more than one carbon atom. When a linear standard is desired for a polymer where the comonomer is C9 or more, one can refer to T. Sun, P. Brant, R. R. Chance, and W. W. Graessley, *Macromolecules*, Volume 34, Number 19, 6812-6820, (2001) for protocols on determining standards for those polymers. In the case of syndiotactic polymers, the standard should have a comparable amount of syndiotacticity as measured by Carbon 13 NMR. The viscosity averaged g' was calculated using the following equation:

$$g'_{vis} = \frac{\sum C_i [\eta_i]_b}{\sum C_i K M_i^\alpha}$$

where $C_i$ is the polymer concentration in the slice i in the polymer peak, and $[\eta_i]_b$ is the viscosity of the branched polymer in slice i of the polymer peak, and $M_i$ is the weight averaged molecular weight in slice i of the polymer peak measured by light scattering, K and α are as defined above.

EXAMPLE 1

These samples were produced in two continuous stirred tank reactors in series. The reactors were operated liquid full under a pressure of 530 psig. The temperature of the lead reactor was controlled through hot oil circulation in the reactor jacket. The temperature of the tail reactor was controlled by steam via a control valve. The residence time of the feed in the lead reactor was 60 minutes, and the residence time in the tail reactor was 50 minutes. Propylene and 1-hexene were combined with hexane to form the feed solution to the lead reactor. A 3 wt % solution of tri-n-octyl aluminum (TNOA) in hexane (obtained from Albemarle) was introduced into this stream before entering into the lead reactor. Catalyst and activator entered the lead reactor from a separate port on the lead reactor. Two separate catalyst solutions Were prepared, one comprising a mixture of di(p-triethylsilylphenyl)methylene](cyclopentadienyl)(3,8-di-t-butylfluorenyl)hafnium dimethyl (catalyst A) in toluene, and the other comprising a mixture of rac-dimethylsilyl bis(2-methyl-4-phenylindenyl) zirconium dimethyl (catalyst B) in toluene. The activator feed stream was made up of a 0.2 wt-% solution of N,N-dimethylanilinium tetrakis(pentafluorophenyl)borate in toluene. Both the catalysts and activator were obtained from Albemarle. The catalyst and activator feed lines were configured to mix in line immediately upstream of the lead reactor, with an estimated contact time of 2 to 4 minutes. Through a separate port to the tail reactor, additional propylene feed (without 1-hexene) was added to the tail reactor. Molten polymer was recovered from solution via two flash stages, each with a preheater. The first stage (30 psig) polymer contained about 5-10% solvent and the second stage (5 torr vacuum) incorporated about 1500 ppm volatile. Following devolatization, polymer was collected into a holdup day-tank for production of large samples. The properties of these polymers and the reaction conditions are summarized in the Table 1A below. Run nos. 1-2 and 1-4 are comparative examples. The polymers were produced under similar condition except that there was no 1-hexene in these two samples.

TABLE 1A

| | Run no. | | | |
| --- | --- | --- | --- | --- |
| | 1-1 | 1-2 | 1-3 | 1-4 |
| TNOA (3 wt. % in hexane) feed rate to lead reactor (g/hr) | 5.9 | 9.07 | 6.35 | 11.34 |
| Catalyst A solution feed rate to lead reactor (g/hr) | 3.72 | 9.07 | 9.53 | 5.44 |
| Catalyst A concentration (wt % in toluene) | 0.5 | 0.46 | 0.5 | 0.47 |
| Catalyst B solution feed rate to lead reactor (g/hr) | 23.59 | 9.07 | 2.45 | 5.44 |
| Catalyst B concentration (wt % in toluene) | 0.05 | 0.036 | 0.05 | 0.026 |
| Activator solution feed rate to lead reactor (g/hr) | 23.59 | 27.22 | 21.77 | 16.33 |
| Activator solution concentration (wt. % in toluene) | 0.2 | 0.2 | 0.2 | 0.2 |
| Lead reactor temperature (° C.) | 115.6 | 129.4 | 114.4 | 110 |
| Tail reactor temperature (° C.) | 115.6 | 129.4 | 114.4 | 110 |

TABLE 1A-continued

| | Run no. | | | |
|---|---|---|---|---|
| | 1-1 | 1-2 | 1-3 | 1-4 |
| Total Feed Rate (kg/hr) | 11.86 | 11.34 | 8.37 | 12.25 |
| Total feed to lead reactor (kg/hr) | 10.05 | 11.34 | 7.69 | 12.25 |
| Hexane Feed to lead reactor (kg/hr) | 6.8 | 8.16 | 5.44 | 9.07 |
| Propylene feed rate to lead reactor (kg/hr) | 2.72 | 3.18 | 2.04 | 3.18 |
| 1-hexene feed to lead reactor (kg/hr) | 0.52 | 0 | 0.2 | 0 |
| Propylene feed rate to tail reactor (kg/hr) | 1.81 | 0 | 0.68 | 0 |
| Viscosity @ 190° C. (mPa · Sec.) | 930 | 1142 | 9300 | 8700 |
| DRI-MW (g/mol) | | 35480 | | 49176 |
| DRI-Mn (g/mol) | | 6221 | | 6187 |
| DRI-Mz (g/mol) | | 76988 | | 154666 |
| g' vis | | 0.876 | | 0.942 |
| Tc (° C.) | 51 | 84 | 35 | 75 |
| Tm (° C.) | 127.9 | 128 | 111 | 140 |
| Heat of fusion (J/g) | 46.9 | 47 | 26 | 24 |
| Tensile strength (MPa) | 9.06 | 6.42 | 4.42 | 1.44 |
| Tensile at break (MPa) | 6.83 | 6.41 | 4.43 | 0.4 |
| Elongation (%) | 184.7 | 27.6 | 1434.5 | 380.5 |
| Toughness (megajoule/m$^3$) | 16.3 | 1.65 | 51.76 | 3.09 |

Run 1-2 and 1-4 are comparative examples. There were produced at the similar condition except that there was no 1-hexene in these two samples. Samples 1-1 and 1-2 listed in Table 1A were tested for packaging adhesive applications. These polymers were formulated with functionalized additives, wax and antioxidant at low shear mixing at elevated temperatures to form a fluid melt. The mixing temperature varied from about 130 to about 190° C. Table 1B below lists the detailed formulation and the properties of the blends for packaging adhesive applications. Irganox 1010 is a phenolic antioxidant available from Ciba-Geigy. MAPP40 is a maleic anhydride modified polypropylene, having an acid number of 50, a viscosity of 300 mPa·sec. at 190° C., and a softening point of 149° C., available from Chusei, USA. AC 820 is polyethylene available from Honeywell, Morris, N.J. Sasol C80 wax is a Fischer-Tropsch wax obtained from Moore and Munger. Inland Paper Board is a high performance box board obtained from Inland Paper Board and Packaging Company of Rome, Ga. It is characterized as a #56 virgin high performance paper board stock. All the adhesion tests were conducted at ambient condition unless otherwise noted. The formulations are in weight percent unless otherwise indicated. Inland Paper Board was used as a substrate for all the tests.

TABLE 1B

| In-reactor produced multi-component copolymer | Run no. 1-1 | Run no. 1-2 |
|---|---|---|
| Polymer (wt %) | 92 | 92 |
| Irganox 1010 (wt %) | 1 | 1 |
| C80 wax (wt %) | 5 | 5 |
| MAPP 40 (wt %) | 2 | 2 |
| Fiber tear at 25° C. | 99 | 100 |
| Fiber tear at 2° C. | 96 | 98 |
| Fiber tear at −18° C. | 97 | 91 |
| Set time (second) | 2.25 | 2.5 |
| Hardness (shore A) | 97 | 90 |

EXAMPLE 2

These samples were produced following the same procedure as used for Example 1. The properties of these polymers and the reaction conditions are summarized in the Table 2A, 2B and 2C below.

TABLE 2A

| | Run no. | | | |
|---|---|---|---|---|
| | 2-1 | 2-2 | 2-3 | 2-4 |
| TNOA (3 wt. % in hexane) feed rate to lead reactor (g/hr) | 3.63 | 8.16 | 3.63 | 8.16 |
| Catalyst A solution feed rate to lead reactor (g/hr) | 2.72 | 0.45 | 2.72 | 0.45 |
| Catalyst A concentration (wt % in toluene) | 0.451 | 0.15 | 0.451 | 0.15 |
| Catalyst B solution feed rate to lead reactor (g/hr) | 10.89 | 9.53 | 10.89 | 9.53 |
| Catalyst B concentration (wt % in toluene) | 0.15 | 0.45 | 0.15 | 0.5 |
| Activator solution feed rate to lead reactor (g/hr) | 21.77 | 19.05 | 21.77 | 19.05 |
| Activator solution concentration (wt. % in toluene) | 0.2 | 0.2 | 0.2 | 0.2 |
| Lead reactor temperature (° C.) | 122.2 | 137.8 | 119.4 | 128.9 |
| Tail reactor temperature (° C.) | 122.2 | 137.8 | 119.4 | 128.9 |
| Total Feed Rate (kg/hr) | 11.88 | 16.01 | 11.88 | 16.01 |
| Total feed to lead reactor (kg/hr) | 10.07 | 14.65 | 10.07 | 14.65 |
| Hexane Feed to lead reactor (kg/hr) | 6.80 | 11.34 | 6.80 | 11.34 |
| Propylene feed rate to lead reactor (kg/hr) | 2.72 | 3.18 | 2.72 | 3.18 |

TABLE 2A-continued

| | Run no. | | | |
|---|---|---|---|---|
| | 2-1 | 2-2 | 2-3 | 2-4 |
| 1-hexene feed to lead reactor (kg/hr) | 0.54 | 0.14 | 0.54 | 0.14 |
| Propylene feed rate to tail reactor (kg/hr) | 1.81 | 1.36 | 1.81 | 1.36 |
| Max Polymer Production (kg/hr) | 5.08 | 4.67 | 5.08 | 4.67 |
| Max Cat Productivity (kg polymer/kg catalyst) | $1.78 \times 10^5$ | $1.07 \times 10^5$ | $1.78 \times 10^5$ | $0.96 \times 10^5$ |
| Viscosity @ 190° C. (mPa · Sec.) | 450.0 | 425.0 | 907.5 | 872.5 |
| DRI-MW (g/mol) | | | 35665 | |
| DRI-Mn (g/mol) | | | 8716 | |
| DRI-Mz (g/mol) | | | 74477 | |
| g' vis | | | 0.764 | |
| Tc (° C.) | 33 | 57 | 50 | |
| Tm (° C.) | 119 | 107 | 126 | |
| Heat of fusion (J/g) | 52 | 29 | 59 | |
| Tensile strength (MPa) | 8.89 | 1.58 | 10.38 | 4.49 |
| Tensile stress at break (MPa) | 7.01 | | 9.08 | 3.12 |
| Tensile stress at yield (MPa) | 8.89 | 1.58 | 10.38 | 4.49 |
| Elongation (%) | 123 | 30 | 412 | 21 |
| Toughness (megajoule/m$^3$) | 3.97 | 0.38 | 9.2 | 0.77 |

TABLE 2B

| | Run no. | | | |
|---|---|---|---|---|
| | 2-5 | 2-6 | 2-7 | 2-8 |
| TNOA (3 wt. % in hexane) feed rate to lead reactor (g/hr) | 7.71 | 7.71 | 7.71 | 7.71 |
| Catalyst A solution feed rate to lead reactor (g/hr) | 0.82 | 0.82 | 1.81 | 0.82 |
| Catalyst A concentration (wt % in toluene) | 0.15 | 0.15 | 0.15 | 0.15 |
| Catalyst B solution feed rate to lead reactor (g/hr) | 6.80 | 6.80 | 5.44 | 6.80 |
| Catalyst B concentration (wt % in toluene) | 0.45 | 0.45 | 0.45 | 0.45 |
| Activator solution feed rate to lead reactor (g/hr) | 14.97 | 14.97 | 13.61 | 14.97 |
| Activator solution concentration (wt. % in toluene) | 0.2 | 0.2 | 0.2 | 0.2 |
| Lead reactor temperature (° C.) | 112.8 | 115.6 | 104.4 | 115.6 |
| Tail reactor temperature (° C.) | 112.8 | 115.6 | 98.9 | 115.6 |
| Total Feed Rate (kg/hr) | 9.25 | 8.85 | 9.25 | 9.00 |
| Total feed to lead reactor (kg/hr) | 8.35 | 7.94 | 8.35 | 8.10 |
| Hexane Feed to lead reactor (kg/hr) | 5.44 | 5.44 | 5.44 | 5.44 |
| Propylene feed rate to lead reactor (kg/hr) | 2.49 | 2.49 | 2.49 | 2.49 |
| 1-hexene feed to lead reactor (kg/hr) | 0.41 | 0 | 0.41 | 0 |
| Ethylene feed rate to lead reactor (kg/hr) | 0 | 0 | 0 | 0.16 |
| Propylene feed rate to tail reactor (kg/hr) | 0.91 | 0.91 | 0.91 | 0.91 |
| Max Polymer Production (kg/hr) | 3.81 | 3.40 | 3.81 | 3.56 |
| Max Cat Productivity (kg polymer/kg catalyst) | $1.20 \times 10^5$ | $1.07 \times 10^5$ | $1.4 \times 10^5$ | $1.13 \times 10^5$ |
| Viscosity @ 190° C. (mPa · Sec.) | 35200 | 39300 | 12888 | 11200 |
| Hardness (Shore A) | 73 | 76 | 94 | 79 |
| DRI-MW (g/mol) | na | Na | 84973 | Na |
| DRI-Mn (g/mol) | na | Na | 15113 | Na |
| DRI-Mz (g/mol) | na | Na | 206867 | Na |
| g' vis | na | Na | 0.808 | Na |
| Tc (° C.) | na | 77 | 27 | Na |
| Tm (° C.) | 101 | 136 | 119 | Na |
| Heat of fusion (J/g) | 15 | 30 | 32 | Na |
| Tensile strength (Mpa) | 6.56 | 1.91 | 13.61 | 2.59 |
| Tensile stress at break (MPa) | 6.56 | 0.88 | 13.60 | |
| Tensile stress at yield (MPa) | 2.30 | 1.91 | 4.58 | 2.59 |
| Elongation (%) | 851 | 113 | 708 | 89 |
| Toughness (megajoule/m$^3$) | 31.77 | 1.84 | 53 | 2.05 |

Run nos. 2-6 and 2-8 are comparative examples. The polymers were produced under similar condition except that there was no 1-hexene in these two samples. Enhancement of mechanical properties through addition of 1-hexene into propylene based polymers is reflected by the increase in tensile property and elongation. Increase in elongation also implies less brittleness of a polymer, which improves adhesive performance and allows use of adhesives with lower viscosity or lower molecular weight. The benefits of 1-hexene addition are diminished when the 1-hexene content exceeds about 20 wt % in the polymer mixture.

TABLE 2C

|  | Run no. | | | |
|---|---|---|---|---|
|  | 2-9 | 2-10 | 2-11 | 2-12 |
| TNOA (3 wt. % in hexane) feed to lead reactor (g/hr) | 4.54 | 5.44 | 7.71 | 6.80 |
| Catalyst A solution feed rate to lead reactor (g/hr) | 6.80 | 4.08 | 0.82 | 1.36 |
| Catalyst A concentration (wt % in toluene) | 0.451 | 0.451 | 0.15 | 0.15 |
| Catalyst B solution feed rate to lead reactor (g/hr) | 27.22 | 16.33 | 6.80 | 6.80 |
| Catalyst B concentration (wt % in toluene) | 0.15 | 0.15 | 0.45 | 0.45 |
| Activator solution feed rate to lead reactor (g/hr) | 54.43 | 32.66 | 14.97 | 14.97 |
| Activator solution concentration (wt. % in toluene) | 0.2 | 0.2 | 0.2 | 0.20 |
| Lead reactor temperature (° C.) | 96.1 | 117.2 | 112.8 | 129.40 |
| Tail reactor temperature (° C.) | 96.1 | 117.2 | 112.8 | 129.40 |
| Total Feed Rate (kg/hr) | 8.71 | 11.88 | 9.66 | 13.24 |
| Total feed to lead reactor (kg/hr) | 7.35 | 10.07 | 8.75 | 13.24 |
| Hexane Feed to lead reactor (kg/hr) | 5.44 | 6.80 | 5.44 | 9.07 |
| Propylene feed rate to lead reactor (kg/hr) | 1.36 | 2.72 | 2.49 | 3.63 |
| 1-hexene feed to lead reactor (kg/hr) | 0.54 | 0.54 | 0.82 | 0.54 |
| Propylene feed rate to tail reactor (kg/hr) | 1.36 | 1.81 | 0.91 | 0.00 |
| Max Polymer Production (kg/hr) | 3.27 | 5.08 | 4.22 | 4.17 |
| Max Cat Productivity (kg polymer/kg catalyst) | $0.46 \times 10^5$ | $1.18 \times 10^5$ | $1.32 \times 10^5$ | $1.28 \times 10^5$ |
| Viscosity @ 190° C. (mPa · Sec.) | 475 | 760 | 21800 | 1430 |
| Hardness (Shore A) | 87 |  | 55 | Na |
| DRI-MW (g/mol) | 36608 | 35486 | 83202 | Na |
| DRI-Mn (g/mol) | 7541 | 7879 | 13238 | Na |
| DRI-Mz (g/mol) | 132200 | 73439 | 178696 | Na |
| g' vis |  |  | 0.866 |  |
| Tc (° C.) | 57 | 53 |  | 9.1 |
| Tm (° C.) | 119 | 123 | 87 | 85 |
| Heat of fusion (J/g) | 32 | 45 | 5 | 14.8 |
| Hexene content in polymer (wt. %) | 13.7 |  |  |  |
| Tensile strength (Mpa) |  |  | 2.69 | 1.95 |
| Tensile stress at break (MPa) |  |  | 2.68 | 1.23 |
| Elongation (%) |  |  | 935 | 128.4 |
| Toughness (megajoule/m$^3$) |  |  | 15.21 | 2.05 |

Selected samples were analyzed using C13 NMR for detailed micro-structural distribution. As an example, the data for polymer produced in Run No. 2-9 is listed in Table 2D.

TABLE 2D

NMR analysis for microstructural distributions for polymer produced in Run no. 2-9

| Triad | 1,2 Insertion Triad Mole Fraction |
|---|---|
| [HHH] | 0.000 |
| [HHP] | 0.036 |
| [PHP] | 0.048 |
| [HPH] | 0.000 |
| [HPP] | 0.086 |
| [PPP] | 0.830 |
| Regios per 10,000 Units | |
| 2,1 erythro | 7 |
| 2,1 threo | 0 |
| 1,3 insertions | 26 |
| End Groups per 10,000 Units | |
| Butyl | 6 |
| Propyl | 25 |
| Isobutyl | 42 |
| Vinylidene | 4 |
| Trisub. | 18 |
| Hexene content (wt %) | 13.7 |

A number of hot melt adhesives were prepared by blending the polymer from the day-tank, which included the polymer produced in Example 2, with one or more of functionalized additives, tackifier, wax, antioxidant, and other ingredients under low shear mixing at elevated temperatures to form a fluid melt. The mixing temperature varied from about 130 to about 190° C. As examples, Table 2E to 2G below lists the detailed formulation and the properties of blends for packaging adhesive applications. Irganox 1010 is a phenolic antioxidant available from Ciba-Geigy. AC 820 is polyethylene available from Honeywell, Morris, N.J. All the adhesion tests were conducted at ambient conditions unless otherwise noted. The formulations are in weight percent unless otherwise indicated. Inland paper board was used as a substrate for all the tests unless otherwise noted. Polymer produced in Run no. 2-2 was also tested on a bacon board as the substrate at 2° C. The bacon board is a Hormel bacon board available from Hormel Foods Incorporation, Austin, Minn.

TABLE 2E

| Multi-component copolymer | Run no. 2-1 | Run no. 2-1 | Run no. 2-2 | Run no. 2-2 | Run no. 2-2 |
|---|---|---|---|---|---|
| Polymer (wt %) | 92 | 100 | 92 | 90 | 87 |
| Irganox 1010 (wt %) | 1 | 0 | 1 | 1 | 1 |
| C80 wax (wt %) | 5 | 0 | 5 | 7 | 10 |
| MAPP40 (wt %) | 2 | 0 | 2 | 2 | 2 |
| Fiber tear at 25° C. | 100 | 0 | na | na | na |
| Fiber tear at 2° C. | 98 | 0 | na | na | na |
| Fiber tear at −18° C. | 77 | 0 | 3 | 0 | 0 |
| Fiber tear on bacon board at 2° C. | na | na | 74 | 65 | 78 |

TABLE 2E-continued

| Multi-component copolymer | Run no. 2-1 | Run no. 2-1 | Run no. 2-2 | Run no. 2-2 | Run no. 2-2 |
|---|---|---|---|---|---|
| Set time (sec) | 2.25 | >6 | 3.5 | 2.25 | 2.5 |
| Hardness (shore A) | 95 | 94 | 69 | 70 | 72 |
| Viscosity @ 190° C. (mPa · Sec) | | | 425 | 365 | 325 |

TABLE 2F

| Multi-component copolymer | Run no. 2-3 | Run no. 2-3 | Run no. 2-3 | Run no. 2-9 | Run no. 2-9 | Run no. 2-9 |
|---|---|---|---|---|---|---|
| Polymer (wt %) | 92 | 92 | 100 | 90 | 90 | 100 |
| Irganox 1010 (wt %) | 1 | 1 | 0 | 1 | 1 | 0 |
| C80 wax (wt %) | 5 | 0 | 0 | 5 | 5 | 0 |
| AC 820 (wt) | 0 | 5 | 0 | 0 | 0 | 0 |
| MAPP40 (wt %) | 2 | 2 | 0 | 4 | 4 | 0 |
| Fiber tear at 25° C. | 99 | 97 | 0 | 99 | 100 | 0 |
| Fiber tear at 2° C. | 99 | 98 | 0 | 97 | 97 | 0 |
| Fiber tear at −18° C. | 100 | 94 | 0 | 93 | 98 | 0 |
| Set time (sec) | 2.5 | 1.75 | >6 | 2.5 | 4.5 | >6 |
| Hardness (shore A) | 98 | 98 | 90 | 79 | 80 | 82 |
| Viscosity @ 190° C. (mPa · Sec) | 740 | 803 | na | na | na | na |

TABLE 2G

| Multi-component copolymer | Run no. 2-10 | Run no. 2-10 | Run no. 2-10 | Run no. 2-10 |
|---|---|---|---|---|
| Polymer (wt %) | 92 | 92 | 93 | 95 |
| Irganox 1010 (wt %) | 1 | 1 | 1 | 1 |
| C80 wax (wt %) | 5 | 0 | 0 | 0 |
| AC 820 (wt) | 0 | 5 | 4 | 2 |
| MAPP40 (wt %) | 2 | 2 | 2 | 2 |
| Fiber tear at 25° C. | 100 | 99 | 100 | 99 |
| Fiber tear at 2° C. | 100 | 97 | 96 | 99 |
| Fiber tear at −18° C. | 97 | 91 | 92 | 95 |
| Set time (sec) | 2.5 | 1.5 | 2 | 3 |
| Hardness (shore A) | 95 | 91 | 93 | 93 |

The multi-component propylene copolymer produced in Run No. 2-12 was tested for applications in disposable articles. This polymer was also formulated with a tackifier for disposable applications. The test was conducted on PET film substrates. The polymers were melted under low shear mixing at elevated temperatures to form a fluid melt. The specimen was produced by combining two 1 inch by 3 inch substrate cut outs with a dot of molten adhesive with a volume that, when compressed under a 500 gram weight occupied about 1 square inch of area. The specimens were then aged for three days at room temperature, then were pulled apart in side by side testing (at a rate of 2 inches per minute) by a machine that records the destructive force of the insult being applied. The maximum force achieved for each sample tested was recorded and averaged, thus producing the Average Maximum Force which is reported as the Dot T-Peel listed in Table 2H. Escorez 5637 is a hydrogenated aromatic modified resin produced from dicyclopentadiene feedstock, exhibiting a ring and ball softening point of 130° C. available from ExxonMobil Chemical Company in Houston, Tex.

TABLE 2H

| Dot T-Peel on a specimen between PET films | | | |
|---|---|---|---|
| Multi-component copolymer | Run no. 2-12 | Run no. 2-12 | Run no. 2-12 |
| Polymer (wt %) | 100 | 92 | 84 |
| Escorez 5637 (wt %) | 0 | 7.5 | 15 |
| Irganox 1010 (wt %) | 0 | 0.5 | 1 |
| Dot T-Peel (Newton) | 26.6 | 56.8 | 81.1 |

The multi-component propylene copolymers produced in Run nos. 2-5 to 2-7 and Run no. 2-11 were tested for applications in wood working. The adhesion test was conducted on a bond between a cloth and a medium density fiberboard (MDF). Weyerhaeuser premier MDF from Malvern, Ark. was purchased from Deer Park Lumber, Deer Park, Tex. The MDF has a density of 48 lb/cubic ft, a MOR of 3,500 psi and a MOE of 350,000 psi. The cloth was a blue stock (#038COTP) printed cotton purchased from High Fashion Fabrics, Houston, Tex. The polymers were melted under low shear mixing at elevated temperatures to form fluid melt. The specimen was produced by combining two 1 inch by 3 inch substrate cut outs with a dot of molten adhesive with a volume that, when compressed under a 500 gram weight occupied about 1 square inch of area (1 inch=2.54 cm). The specimens were then aged for three days at room temperature, then were pulled apart in side by side testing (at a rate of 2 inches per minute) by a machine that records the destructive force of the insult being applied. The maximum force achieved for each sample tested was recorded and averaged, thus producing the Average Maximum Force which is reported as the Dot T-Peel listed in Table 2I.

TABLE 2I

| Dot T-peel on a specimen between a cloth and a medium density fiberboard | | | | | |
|---|---|---|---|---|---|
| Multi-component copolymer | Run No. 2-7 | Run No. 2-11 | Run No. 2-5 | Run No. 2-6 | Run No. 2-8 |
| Polymer (wt %) | 100 | 100 | 100 | 100 | 100 |
| Dot T-Peel (Newton) | 62.6 | 71.3 | 57.6 | 31.4 | 34.0 |

What we claim is:

1. An adhesive composition comprising:
(a) 85 to 90 wt% of an in-reactor produced multi-component copolymer comprising a semi-crystalline component having a crystallinity of 20% or more, and an amorphous component having a crystallinity of 5% or less, wherein the copolymer comprises at least 80 wt% of units derived from propylene and from 1 wt% to 20 wt% of at least one comonomer selected from a group consisting of hexene-1 and octene-1, wherein the copolymer has a viscosity at 190° C. of 530 to 1500 mPa sec and a heat of fusion between 20 and 50 J/g; wherein the multi-component copolymer has a branching index of 0.764 to 0.95 as measured at z-average molecular weight and a weight averaged molecular weight of the semi-crystalline copolymer is from 5,000 to 100,000; wherein the semi-crystalline component is produced by a first catalyst system and the amorphous component is produced by a second catalyst system;
wherein the first catalyst system comprises di(p-triethylsilylphenyl) methylene (cyclopentadienyl) (3,8-di-t-butylfluorenyl) $MR_2$ where M is zirconium or hafnium and R is Cl or $CH_3$, and the second catalyst system comprises rac-dimethylsilyl bis (2-methyl-4-phenylindenyl) M*R*$_2$, where M* is zirconium or hafnium, and R* is Cl or CH$_3$;

wherein the semi-crystalline component is incorporated into the amorphous component so as to form a branched cross-product with both amorphous and semi-crystalline characteristics;

wherein the weight ratio of the semi-crystalline component to the amorphous component is from about 90:10 to about 30:70; and wherein the copolymer has an elongation of 400 to 1434.5% and a toughness of 7 to 53 megajoule/m$^3$;

(b) 1 to 10 wt% of at least one tackifier; and (c) 2 to 10 wt% of at least one functionalized polyolefin, wherein the functionalized polyolefin is functionalized with maleic acid or maleic anhydride.

2. The adhesive composition of claim 1 wherein the ratio of the weight averaged molecular weight of the copolymer to the number averaged molecular weight of the copolymer is between 4 and 9.

3. The adhesive composition of claim 1 and further comprising a polypropylene homopolymer component.

4. The adhesive composition of claim 1 wherein the copolymer comprises about 2 wt% to about 12 wt% of units derived from hexene-1.

5. The adhesive composition of claim 1 wherein the copolymer comprises about 3 wt% to about 10 wt% of units derived from hexene-1.

* * * * *